United States Patent
Kaminaga et al.

(10) Patent No.: US 9,873,116 B2
(45) Date of Patent: Jan. 23, 2018

(54) ION EXCHANGE MEMBRANE, METHOD FOR MANUFACTURING SAME, MODULE, AND DEVICE

(71) Applicant: FUJIFILM CORPORATION, Minato-ku, Tokyo (JP)

(72) Inventors: Kuniyuki Kaminaga, Kanagawa (JP); Kazuomi Inoue, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/413,432

(22) Filed: Jan. 24, 2017

(65) Prior Publication Data
US 2017/0128931 A1 May 11, 2017

Related U.S. Application Data

(63) Continuation of application No. PCT/JP2015/072606, filed on Aug. 10, 2015.

(30) Foreign Application Priority Data

Aug. 14, 2014 (JP) .................................. 2014-165080

(51) Int. Cl.
*B01J 41/14* (2006.01)
*B01J 47/12* (2017.01)
(Continued)

(52) U.S. Cl.
CPC .............. *B01J 41/14* (2013.01); *B01J 41/07* (2017.01); *B01J 47/12* (2013.01); *C08F 8/32* (2013.01);
(Continued)

(58) Field of Classification Search
CPC ... B01J 41/14; B01J 41/07; B01J 47/12; C08J 5/22; C08J 5/2243; C08J 2325/18; C08J 2453/02; C08F 12/18; C08F 8/32
(Continued)

(56) References Cited

U.S. PATENT DOCUMENTS

| | | | | |
|---|---|---|---|---|
| 6,068,794 A * | 5/2000 | Kobayashi | ............. | G02B 1/105 252/585 |
| 6,114,484 A * | 9/2000 | Ward | ..................... | C08F 20/34 526/280 |
| 2012/0165419 A1* | 6/2012 | Zheng | ................... | C08J 5/2206 521/27 |

FOREIGN PATENT DOCUMENTS

| JP | H06-329815 A | 11/1994 |
|---|---|---|
| JP | 2009-193957 A | 8/2009 |

(Continued)

*Primary Examiner* — Michael M Bernshteyn
(74) *Attorney, Agent, or Firm* — SOLARIS Intellectual Property Group, PLLC

(57) ABSTRACT

An ion exchange membrane of the present invention contains a resin having an amino group and a constitutional unit represented by Formula 1, in which the number of amino groups per dry mass is 0.15 to 2.4 mmol/g. In Formula 1, $L^1$ represents an alkylene group or an alkenylene group, $R^a$, $R^b$, $R^c$, and $R^d$ each independently represent an alkyl group or an aryl group, $R^a$ and $R^b$ and/or $R^c$ and $R^d$ may form a ring by being bonded to each other, n1 and n2 each independently represent an integer of 1 to 10, and $X_1^-$ and $X_2^-$ each independently represent an organic or inorganic anion.

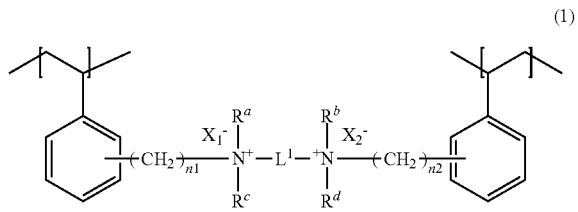

(1)

16 Claims, 1 Drawing Sheet

(51) Int. Cl.
  *C08J 5/22*   (2006.01)
  *B01J 41/07*  (2017.01)
  *C08F 212/14* (2006.01)
  *C08F 12/18*  (2006.01)
  *C08F 8/32*   (2006.01)

(52) U.S. Cl.
  CPC ............ *C08F 12/18* (2013.01); *C08F 212/14* (2013.01); *C08J 5/22* (2013.01); *C08J 5/2243* (2013.01); *C08J 2325/18* (2013.01); *C08J 2453/02* (2013.01)

(58) Field of Classification Search
  USPC .......................................................... 521/27
  See application file for complete search history.

(56) References Cited

FOREIGN PATENT DOCUMENTS

| | | | |
|---|---|---|---|
| JP | 2009193957 A | * | 8/2009 |
| JP | 2013-503038 A | | 1/2013 |

* cited by examiner

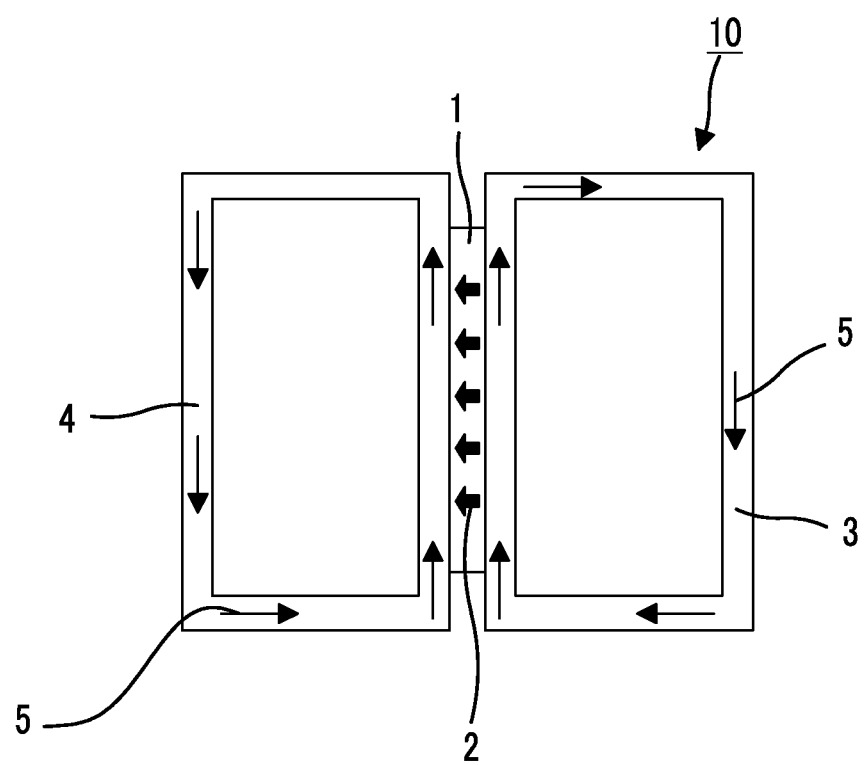

ION EXCHANGE MEMBRANE, METHOD FOR MANUFACTURING SAME, MODULE, AND DEVICE

CROSS-REFERENCE TO RELATED APPLICATIONS

This application is a Continuation of International Application No. PCT/JP2015/072606 filed on Aug. 10, 2015, which claims priority to Japanese Patent Application No. 2014-165080 filed on Aug. 14, 2014. The entire contents of these applications are incorporated herein by reference.

BACKGROUND OF THE INVENTION

1. Field of the Invention

The present invention relates to an ion exchange membrane, a method for manufacturing the same, a module, and a device.

2. Description of the Related Art

An ion exchange membrane is used for electrodeionization (EDI), continuous electrodeionization (CEDI), electroldialysis (ED), electrodialysis reversal (EDR), and the like.

EDI is a water treatment process of removing ions from an aqueous liquid by using an ion exchange membrane and potential for achieving ion transport. Unlike other water purification techniques such as ion exchange used in the related art, EDI does not need to use an acid or a chemical such as sodium hydroxide and can be used for producing ultrapure water. ED and EDR are electrochemical separation processes of removing ions and the like from water and other fluids.

As ion exchange membranes of the related art, for example, those described in JP2009-193957A, JP1994-329815A (JP-H06-329815A), US2012/0165419A, and JP2013-503038A are known.

SUMMARY OF THE INVENTION

An object of the present invention is to provide a high-performance ion exchange membrane having a small defect and a sufficient mechanical strength, a method for manufacturing the ion exchange membrane, and a module and a device which include the ion exchange membrane.

The aforementioned object of the present invention was achieved by means described below in <1>, <8>, <15>, or <16>. Preferred embodiments are also described below in <2> to <7> and <9> to <14>.

<1> An ion exchange membrane comprising a resin having an amino group and a constitutional unit represented by Formula 1, in which the number of amino groups per dry mass is 0.15 to 2.4 mmol/g,

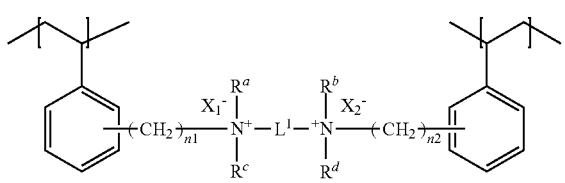

in Formula 1, $L^1$ represents an alkylene group or an alkenylene group, $R^a$, $R^b$, $R^c$, and $R^d$ each independently represent an alkyl group or an aryl group, $R^a$ and $R^b$ and/or $R^c$ and $R^d$ may form a ring by being bonded to each other, n1 and n2 each independently represent an integer of 1 to 10, and $X_1^-$ and $X_2^-$ each independently represent an organic or inorganic anion.

<2> The ion exchange membrane described in <1>, in which the resin has, as a structure having the amino group, a constitutional unit represented by the following Formula 2 in at least a portion of the resin,

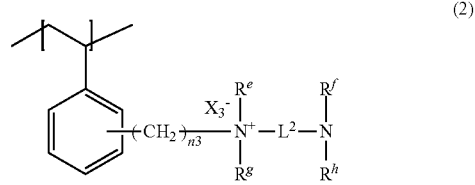

in Formula 2, $L^2$ represents an alkylene group or an alkenylene group, $R^e$, $R^f$, $R^g$, and $R^h$ each independently represent an alkyl group or an aryl group, $R^e$ and $R^f$ and/or $R^g$ and $R^h$ may form a ring by being bonded to each other, n3 represents an integer of 1 to 10, and $X_3^-$ represents an organic or inorganic anion.

<3> The ion exchange membrane described in <1> or <2>, in which $R^a$ and $R^b$ and/or $R^c$ and $R^d$ form a ring by being bonded to each other.

<4> The ion exchange membrane described in <2>, in which $R^e$ and $R^f$ and/or $R^g$ and $R^h$ form a ring by being bonded to each other.

<5> The ion exchange membrane described in any one of <1> to <4>, in which $X_1^-$ and $X_2^-$ each independently are a halide ion.

<6> The ion exchange membrane described in any one of <1> to <5>, in which the resin further has a cross-linked structure in addition to the constitutional unit represented by Formula 1.

<7> The ion exchange membrane described in <6>, in which a content of the cross-linked structure other than the constitutional unit represented by Formula 1 is 0.05 to 0.5 mmol/g with respect to a total mass of the resin.

<8> A method for manufacturing the ion exchange membrane described in any one of <1> to <7>, comprising a membrane preparation step of preparing a membrane containing the resin having a constitutional unit represented by Formula 3, and a reaction step of reacting the membrane with an amine compound represented by Formula 4,

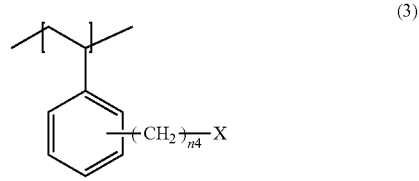

In Formulae 3 and 4, n4 represents an integer of 1 to 10, X represents a leaving group, $L^3$ represents an alkylene group or an alkylene group, $R^i$, $R^j$, $R^k$, and $R^m$ each independently represent an alkyl group or an aryl group, and $R^i$ and $R^j$ and/or $R^k$ and $R^m$ may form a ring by being bonded to each other.

<9> The method for manufacturing the ion exchange membrane described in <7> or <8>, in which in the membrane preparation step, the resin having the constitutional unit represented by Formula 3 is formed by polymerizing a composition containing a compound represented by Formula 5 and a polymerization initiator,

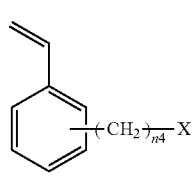

(5)

in Formula 5, n4 represents an integer of 1 to 10, and X represents a leaving group.

<10> The method for manufacturing the ion exchange membrane described in <9>, in which the compound represented by Formula 5 is a liquid at 25° C.

<11> The method for manufacturing the ion exchange membrane described in <9> or <10>, in which a content of the compound represented by Formula 5 in the composition is equal to or greater than 50% by weight.

<12> The method for manufacturing the ion exchange membrane described in any one of <9> to <11>, in which the composition does not contain an organic solvent, or a content of an organic solvent in the composition is greater than 0% by mass and equal to or less than 1% by mass.

<13> The method for manufacturing the ion exchange membrane described in any one of <8> to <12>, in which X is a halogen atom.

<14> The method for manufacturing the ion exchange membrane described in any one of <8> to <13>, in which in the reaction step, both of the constitutional unit represented by Formula 1 and the constitutional unit represented by Formula 2 are formed in the resin.

<15> A module comprising the ion exchange membrane described in any one of <1> to <7> or an ion exchange membrane obtained by the manufacturing method described in any one of <8> to <14>.

<16> A device comprising the ion exchange membrane described in any one of <1> to <7> or an ion exchange membrane obtained by the manufacturing method described in any one of <8> to <14>.

According to the present invention, it is possible to provide a high-performance ion exchange membrane having a small defect and a sufficient mechanical strength, a method for manufacturing the ion exchange membrane, and a module and a device which include the ion exchange membrane.

BRIEF DESCRIPTION OF THE DRAWINGS

FIG. 1 is a schematic view of a flow channel of a device for measuring a water permeability of a membrane.

DESCRIPTION OF THE PREFERRED EMBODIMENTS

Hereinafter, the contents of the present invention will be specifically described. The following constituents will be described based on typical embodiments of the present invention in some cases, by the present invention is not limited to the embodiments. In the present specification, "to" is used to signify that numerical values listed before and after "to" are a lower limit and an upper limit respectively.

In the present specification, in a case where there is no description regarding whether or not a group (atomic group) is substituted or unsubstituted, the group includes both of a group not having a substituent and a group having a substituent. For example, an "alkyl group" includes not only an alkyl group not having a substituent (unsubstituted alkyl group) but also an alkyl group having a substituent (substituted alkyl group).

In the present specification, some chemical structural formulae will be described as simplified structural formulae in which a hydrogen atom is omitted.

In the present specification, "(meth)acrylate" represents acrylate and methacrylate, "(meth)acryl" represents acryl and methacryl, and "(meth)acryloyl" represents acryloyl and methacryloyl.

In the present invention, "% by mass" has the same definition as "% by weight", and "part mass" has the same definition as "part by weight".

In the present invention, a combination of preferred aspects is a more preferred aspect.

(Ion Exchange Membrane)

An ion exchange membrane (hereinafter, simply referred to as a "membrane" as well) of the present invention contains a resin (hereinafter, referred to as an "ion exchange resin" as well) having an amino group and a constitutional unit represented by Formula 1, in which the number of amino groups per dry mass is 0.15 to 2.4 mmol/g.

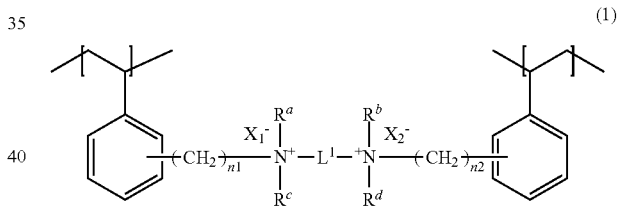

(1)

In Formula 1, $L^1$ represents an alkylene group or an alkenylene group, $R^a$, $R^b$, $R^c$, and $R^d$ each independently represent an alkyl group or an aryl group, $R^a$ and $R^b$ and/or $R^c$ and $R^d$ may form a ring by being bonded to each other, n1 and n2 each independently represent an integer of 1 to 10, and $X_1^-$ and $X_2^-$ each independently represent an organic or inorganic anion.

In order to achieve the aforementioned object, the inventors of the present invention repeated intensive investigation. As a result, they obtained knowledge that, by trying to make an ion exchange membrane which contains a resin having an amino group and a constitutional unit represented by Formula 1 and in which the number of amino groups per dry mass is within a certain range, it is possible to obtain an ion exchange membrane which has a small defect, a sufficient mechanical strength, a low electrical resistance, and a low water permeability. Based on this knowledge, the inventors accomplished the present invention.

Presumably, if the resin has the constitutional unit represented by Formula 1, the constitutional unit may function as a cross-linked structure, and accordingly, the occurrence of a defect of the membrane may be inhibited, and the mechanical strength of the membrane may become excellent. Generally, if an amino group is introduced into a membrane, the density of ionic groups or cross-linked structures in the membrane is reduced, and this leads to a concern that the performance will deteriorate. However, surprisingly, the inventors of the present invention found that, in a case where the constitutional unit represented by Formula 1 and an amino group in an amount described above were introduced into the ion exchange membrane, the performance deterioration described above was not confirmed, and an ion exchange membrane which had a small defect, a sufficient mechanical strength, a low electrical resistance, and a low water permeability was obtained, although the detailed mechanism bringing about such effects is unclear.

The ion exchange membrane of the present invention can be particularly suitably used as an anion exchange membrane.

Furthermore, the ion exchange membrane of the present invention can be suitably used in a reverse osmosis membrane, a forward osmosis membrane, and a gas separation membrane.

A thickness of the ion exchange membrane of the present invention varies with the use or the usage form thereof. In a case where the ion exchange membrane has a support, a total thickness thereof including the support is preferably 10 to 500 µm, more preferably 20 to 400 µm, even more preferably 30 to 400 µm, and particularly preferably 30 to 300 µm.

<Resin having Amino Group and Constitutional Unit Represented by Formula 1>

The ion exchange membrane of the present invention contains a resin having an amino group and a constitutional unit represented by Formula 1.

In Formula 1, $L^1$ represents an alkylene group or an alkenylene group. $L^1$ is preferably an alkylene group, and more preferably a 1,2-ethylene group.

The alkylene group and the alkenylene group may have a branch or a ring structure.

The number of carbon atoms of $L^1$ is preferably 2 to 10, more preferably 2 to 4, and even more preferably 2.

$R^a$, $R^b$, $R^c$, and $R^d$ each independently represent an alkyl group or an aryl group. It is preferable that $R^a$, $R^b$, $R^c$, and $R^d$ each represent an alkyl group, and $R^a$ and $R^b$ and/or $R^c$ and $R^d$ may form a ring by being bonded to each other. It is more preferable that $R^a$ and $R^b$ or $R^c$ and $R^d$ form a ring by being bonded to each other. It is particularly preferable that $R^a$ and $R^b$ as well as $R^c$ and $R^d$ form a ring by being bonded to each other.

In a case where $R^a$ and $R^b$ and/or $R^c$ and $R^d$ form a ring by being bonded to each other, a group through which $R^a$ and $R^b$ and/or $R^c$ and $R^d$ are bonded to each other is preferably an alkylene group, more preferably an alkylene group having 2 to 4 carbon atoms, and even more preferably a 1,2-ethylene group.

The number of carbon atoms that $R^a$, $R^b$, $R^c$, and $R^d$ each independently have is preferably 1 to 20, more preferably 1 to 10, and even more preferably 1 to 4.

In a case where $R^a$, $R^b$, $R^c$, and $R^d$ do not form a ring by being bonded to each other, the alkyl group is preferably an alkyl group having 1 to 4 carbon atoms and more preferably a methyl group, and the aryl group is preferably an aryl group having 6 to 10 carbon atoms and more preferably a phenyl group.

The alkyl group may have a branch or a ring structure.

n1 and n2 each independently represent an integer of 1 to 10. n1 and n2 preferably represent an integer of 1 to 4, more preferably represent 1 or 2, and even more preferably represent 1.

From the viewpoint of synthesis, n1 and n2 are preferably the same as each other.

$X_1^-$ and $X_2^-$ each independently represent an organic or inorganic anion. It is preferable that $X_1^-$ and $X_2^-$ each independently represent an inorganic anion. The organic or inorganic anion may be a monovalent anion or an anion with a valence of 2 or greater. In a case where the organic or inorganic anion is an anion with a valence of 2 or greater, the anion is present in an amount that is electrically equivalent to the amount of a cation of an ammonium group or the like in Formula 1. For example, $X_1^-$ and $X_2^-$ in Formula 1 may represent a single divalent anion, or the anion may be present as $X_1^-$ and/or $X_2^-$ of the constitutional unit represented by Formula 1 having two or more anions with a valence of 2 or greater.

Examples of the organic anion include an alkane or arene sulfonate ion and an alkyl or aryl carboxylate ion. Specific examples thereof include a methane sulfonate ion, a benzene sulfonate ion, toluene sulfonate ion, and an acetate ion.

Examples of the inorganic anion include a halide ion, a sulfate ion, a nitrate ion, a carbonate ion, and a phosphate ion, and among these, a halide ion is preferable. The halide ion is preferably a chloride ion or a bromide ion, and particularly preferably a chloride ion.

The organic or inorganic anion is preferably an alkane or arene sulfonate ion, an alkyl or aryl carboxylate ion, a halide ion, or a sulfate ion, more preferably an alkane or arene sulfonate ion, a halide ion, or a sulfate ion, and even more preferably a halide ion.

$L^1$, $R^a$, $R^b$, $R^c$, and $R^d$ may have a Substituent.

Examples of the substituent include an alkyl group, an aryl group, an alkenyl group, an alkynyl group, a hydroxy group, an alkoxy group, an aryloxy group, an amino group, a halogen atom, an acyl group, an acyloxy group, a cyano group, and a nitro group.

The constitutional unit represented by Formula 1 is preferably a constitutional unit represented by any one of the following Formulae 1-1 to 1-6, more preferably a constitutional unit represented by any one of the following Formulae 1-1 to 1-4, even more preferably a constitutional unit represented by the following Formula 1-1 or 1-2, and particularly preferably a constitutional unit represented by the following Formula 1-1.

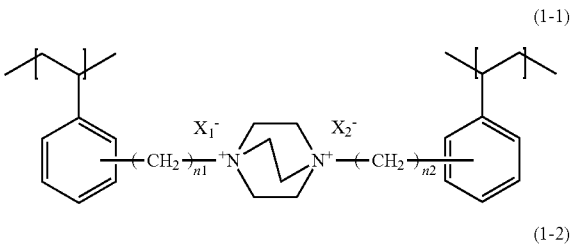

(1-1)

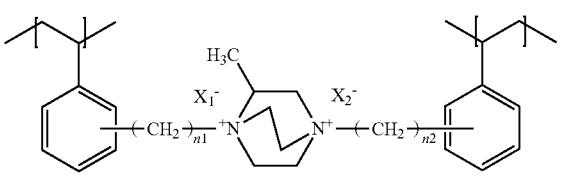

(1-2)

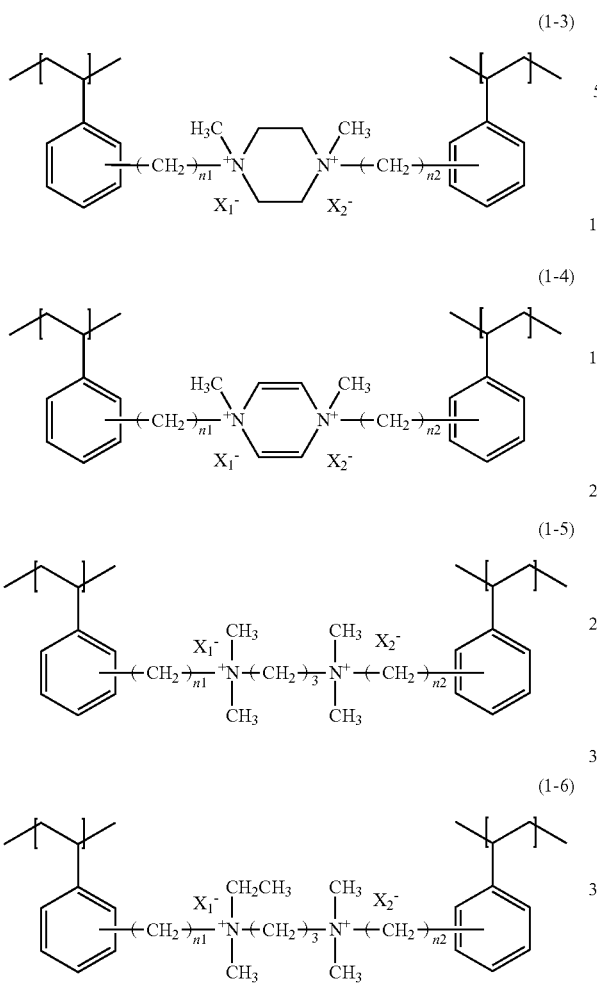

(1-3)

(1-4)

(1-5)

(1-6)

n1, n2, $X_1^-$, and $X_2^-$ in Formulae 1-1 to 1-6 have the same definition as n1, n2, $X_1^-$, and $X_2^-$ in Formula 1, and preferred aspects thereof are also the same.

The aforementioned resin may have only one kind of constitutional unit represented by Formula 1 or two or more kinds thereof.

In the resin, a content of the constitutional unit represented by Formula 1 is, with respct to a total mass of the resin, preferably 15 to 90% by mass, more preferably 20 to 90% by mass, and even more preferably 30 to 85% by mass. If the content is within the above range, the mechanical strength and performance of the membrane are further improved.

The ion exchange membrane of the present invention contains the resin having an amino group and the constitutional unit represented by Formula 1.

The amino group may be a primary, secondary, or tertiary amino group. It is preferable that the amino group is a tertiary amino group.

The resin may have only one kind of amino group or two or more kinds thereof.

It is preferable that the resin has, as a structure having the aforementioned amino group, a constitutional unit represented by the following Formula 2.

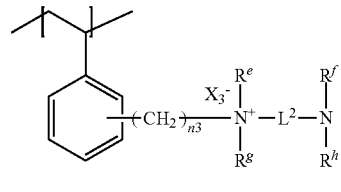

(2)

In Formula 2, $L^2$ represents an alkylene group or an alkenylene group, $R^e$, $R^f$, $R^g$, and $R^h$ each independently represent an alkyl group or an aryl group, $R^e$ and $R^f$ and/or $R^g$ and $R^h$ may form a ring by being bonded to each other, n3 represents an integer of 1 to 10, and $X_3^-$ represents an organic or inorganic anion.

$L^2$, $R^e$, $R^f$, $R^g$, $R^h$, n3, and $X_3^-$ in Formula 2 have the same definition as $L^1$, $R^a$, $R^b$, $R^c$, $R^d$, n1, and $X_1^-$ in Formula 1 respectively, and preferred aspects thereof are also the same.

In a case where the aforementioned resin is a resin having the constitutional unit represented by Formula 1 and the constitutional unit represented by Formula 2, $L^2$, $R^e$, $R^f$, $R^g$, $R^h$, n3, and $X_3^-$ in Formula 2 are preferably the same as $L^1$, $R^a$, $R^bR^c$, $R^d$, n1, and $X_1^-$ in Formula 1 respectively.

The constitutional unit represented by Formula 2 is preferably a constitutional unit represented by any of the following Formulae 2-1 to 2-7, more preferably a constitutional unit represented by any of the following Formulae 2-1 to 2-4, even more preferably a constitutional unit represented by the following Formula 2-1 or 2-2, and particularly preferably a constitutional unit represented by the following Formula 2-1.

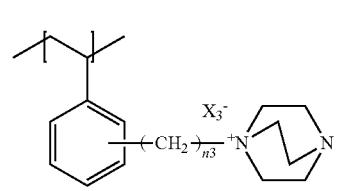

(2-1)

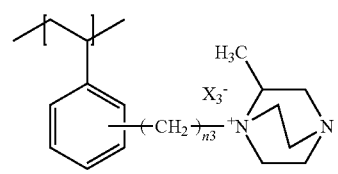

(2-2)

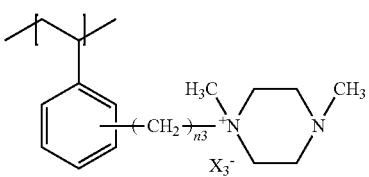

(2-3)

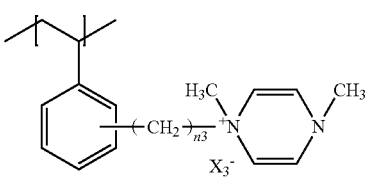

(2-4)

-continued

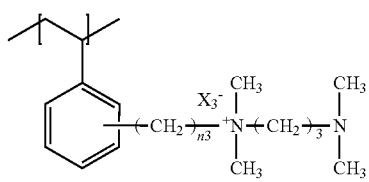
(2-5)

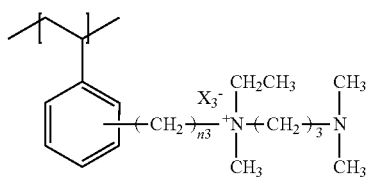
(2-6)

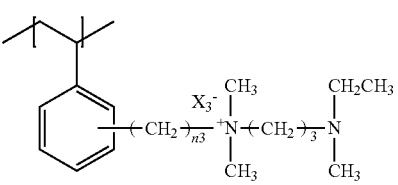
(2-7)

n3 and $X_3^-$ in Formulae 2-1 to 2-7 have the same definition as n3 and $X_3^-$ in Formula 2, and preferred aspects thereof are also the same.

The aforementioned resion may have only one kind of constitutional unit represented by Formula 2 or two or more kinds thereof.

A content of the constitutional unit represented by Formula 2 in the resin is not particularly limited, as long as the number of amino groups per dry mass of the ion exchange membrane becomes 0.15 to 2.4 mmol/g.

In a case where the resin is a resin having the constitutional unit represented by Formula 1 and the constitutional unit represented by Formula 2, a molar ratio between the constitutional unit represented by Formula 1 and the constitutional unit represented by Formula 2 is preferably 10:1 to 1:10, more preferably 8:1 to 1:8, and even more preferably 4:1 to 1:6.

The aforementioned resin preferably further has a constitutional unit represented by the following Formula 3.

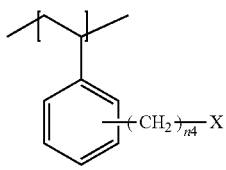
(3)

In Formula 3, n4 represents an integer of 1 to 10, and X represents a leaving group.

n4 in Formula 3 has the same definition as n1 in Formula 1, and a preferred aspect thereof is also the same.

X represents a leaving group, and examples thereof preferably include a halogen atom, a sulfonic acid ester group, a carboxylic acid ester group, and a phosphoric acid ester group, more preferably include a chlorine atom, a bromine atom, an iodine atom, and a sulfonic acid ester group, even more preferably include a chlorine atom, a bromine atom, an iodine atom, a p-toluenesulfonyloxy group (tosylate group), a methanesulfonyloxy group (mesylate group), and a trifluoromethanesulfonyloxy group (triflate group), particularly preferably include a chlorine atom and a bromine atom, and most preferably include a chlorine atom.

The aforementioned resin may have only one kind of constitutional unit represented by Formula 3 or two or more kinds thereof.

A total content of the constitutional unit represented by Formula 1, the constitutional unit represented by Formula 2, and the constitutional unit represented by Formula 3 in the resin is, with respect to a total mass of the resin, preferably equal to or greater than 50% by mass, more preferably equal to or greater than 70% by mass, even more preferably equal to or greater than 80% by mass, particularly preferably equal to or greater than 90% by mass, and most preferably 90 to 99.5% by mass. If the content is within the above range, the mechanical strength of the membrane is further improved, and a membrane having a lower electrical resistance and a lower water permeability is obtained.

It is preferable that the resin further has a cross-linked structure in addition to the constitutional unit represented by Formula 1. If the above aspect is adopted, a physical strength of the membrane is further improved.

A content of the cross-linked structure other than the constitutional unit represented by Formula 1 is preferably 0.05 to 0.5 mmol/g with respect to a total mass of the resin.

The cross-linked structure is preferably an aromatic ring-containing cross-linked structure which is a constitutional unit represented by the following Formula c-1 or c-2.

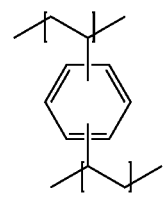
(c-1)

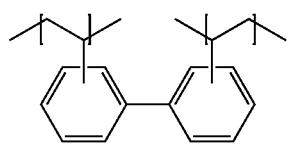
(c-2)

The resin in the ion exchange membrane of the present invention may have other strutures, for example, other constitutional units different from the constitutional units and the cross-linked structure described above. A content of the aforementioned other structures is, with respect to a total mass of the ion exchange membrane, preferably less than 30% by mass, more preferably less than 20% by mass, even more preferably less than 10% by mass, and particularly preferably less than 5% by mass.

Examples of other constitutional units that the resin may have include a constitutional unit derived from a styrene compound, a constitutional unit derived from a (meth)acrylate compound, a constitutional unit derived from a vinyl ether compound, and the like other than the constitutional units described above. Among these, a constitutional unit derived from styrene is preferable.

In the ion exchange membrane of the present invention, the number of amino groups per dry mass is 0.15 to 2.4 mmol/g. The dry mass is a total mass of the ion exchange membrane. For example, in a case where the ion exchange membrane has a support, it is a dry mass of the membrane including the support.

If the number of amino groups is less than 0.15 mmol, defects of the membrane increase, and the mechanical strength of the membrane deteriorates. If the number of amino groups is greater than 2.4 mmol, the water permeability increases, defects of the mebrane increase, and the mechanical strength of the membrane deteriorates.

In the ion exchange membrane of the present invention, the number of amino groups per dry mass is preferably 0.16 to 2.3 mmol, more preferably 0.17 to 2.2 mmol, even more preferably 0.30 to 2.2 mmol, and particularly preferably 0.50 to 2.0 mmol. If the number of amino groups is within the above range, the electrical resistance and water permeability of the membrane can be further reduced.

<Support>

The ion exchange membrane of the present invention preferably has a support, and more preferably has a porous support.

Examples of the support include a resin film, woven cloth, non-woven cloth, a sponge, and the like. Among these, non-woven cloth is preferable.

Examples of the porous support include woven cloth, non-woven cloth, a sponge-like film, a film having fine through holes, and the like.

Examaples of materials forming the support include polyolefin (polyethylene, polypropylene, or the like), polyacrylonitrile, polyvinyl chloride, polyester, polyamide, polysulfone, polyether sulfone, polyphenylene sulfone, polyphenylene sulfide, polyimide, polyether imide, polyamide imide, polycarbonate, an acrylic resin, cellulose acetate, polyvinylidene fluoride, polytetrafluoroethyl ene, polyhexafluoropropylene, polychlorotrifluoroethylene, and a copolymer of these.

As commercially available porous supports, those marketed by Japan Vilene Company, Ltd, Freudenberg & Co. KG, Filtration Technologies, LLC, and Sefar AG are exemplified.

It is preferable that the support is hydrophilic. As a technique for making the support hydrophilic, it is possible to use general methods such as a corona treatment, an ozone treatment, a sulfuric acid treatment, and a silane coupling agent treatment.

A thickness of the support is preferably 10 to 500 μm, more preferably 20 to 400 μm, even more preferably 30 to 400 μm, and particularly preferably 30 to 300 μm.

The ion exchange membrane of the present invention is preferably a membrane having the resin, which has an amino group and the constitutional unit represented by Formula 1, within a surface and/or inside of the porous support.

Furthermore, the ion exchange membrane of the present invention is preferably a membrane containing water, and more preferably a membrane in which the resin having an amino group and the constitutional unit represented by Formula 1 is in the form of gel by containing water.

The ion exchange membrane of the present invention may contain known additives as other components. For example, the ion exchange membrane may contain a polymer compound, a polymer dispersant, an anti-cratering agent, a plasticizer, a viscosity adjuster, an antioxidant, and/or a preservative. The ion exchange membrane may also contain additives such as a surfactant used before forming the membrane or at the time of forming the membrane and/or a polymerization inhibitor.

For adjusting physical properties of the membrane, in addition to the resin having an amino group and the constitutional unit represented by Formula 1, various polymer compounds can also be added to the ion exchange membrane of the present invention.

As the polymer compounds, it is possible to use an acrylic polymer, a polyurethane resin, a polyamide resin, a polyester resin, an epoxy resin, a phenol resin, a polycarbonate resin, a polyvinyl butyral resin, a polyvinyl formal resin, shellac, a vinyl-based resin, an acrylic resin, a rubber-based resin, waxes, other natural resins, and the like. One kind of these may be used singly, or two or more kinds thereof may be used in combination.

The ion exchange membrane of the present invention may also contain a polymer dispersant.

Specific examples of the polymer dispersant include polyvinyl pyrrolidone, polyvinyl alcohol, polyvinyl methyl ether, polyethylene oxide, polyethylene glycol, polypropylene glycol, polycrylamide, and the like.

The anti-cratering agent is also referred to as a surface conditioner, a leveling agent, or a slip agent and is used for preventing irregularities on the membrane surface. Examples thereof include compounds having a structure of organic modified polysiloxane (mixture of polyether siloxane and polyether), a polyether modified polysiloxane copolymer, or a silicon modified copolymer.

Examples of commercially available anti-cratering agents include Tego Glide 432, Tego Glide 110, Tego Glide 130, Tego Glide 406, Tego Glide 410, Tego Glide 411, Tego Glide 415, Tego Glide 420, Tego Glide 435, Tego Glide 440, Tego Glide 450, Tego Glide 482, Tego Glide A115, Tego Glide B1484, and Tego Glide ZG400 (all of these are trade names) manufactured by Evonik Industries.

An amount of the anti-cratering agent is, with respect to a total mass of the ion exchange membrane that is 100 parts by mass, preferably 0 to 10 parts by mass, more preferably 0 to 5 parts by mass, and even more preferably 1 to 2 parts by mass.

The ion exchange membrane of the present invention may contain a surfactant such as a nonionic surfactant, a cationic surfactant, or an organic fluoro compound so as to adjust the physical properties of a coating solution used at the time of forming the membrane.

Specific examples of the surfactant include an anionic surfactant such as alkylbenzene sulfonate, alkylnaphthalene sulfonate, a higher fatty acid salt, sulfonate of a higher fatty acid ester, a sulfonic acid ester salt of higher alcohol ether, sulfonate of higher alcohol ether, alkyl carboxylate of higher alkyl sulfonamide, or alkyl phosphate, a nonionic surfactant such as polyoxyethylene alkyl ether, polyoxyethylene alkyl phenyl ether, polyoxyethylene fatty acid ester, sorbitan fatty acid ester, an ethylene oxide adduct of acetylene glycol, ethylene oxide adduct of glycerine, or polyoxyethylene sorbitan fatty acid ester, an amphoteric surfactant such as alkyl betaine or amide betaine, a silicone-based surfactant, a fluorine-based surfactant, and the like. The surfactant can be appropriately selected from these, surfactants known in the related art, and derivatives thereof.

The ion exchange membrane of the present invention may also contain a polymerization inhibitor so as to impart stability to a coating solution used at the time of forming the membrane.

As the polymerization inhibitor, a known polymerization inhibitor can be used, and examples thereof include a phenol compound, a hydroquinone compound, an amine compound, a mercapto compound, and the like.

Examples of the phenol compound include hindered phenol (phenol having a t-butyl group in an ortho position, typical examples thereof include 2,6-di-t-butyl-4-methyl phenol) and bisphenol. Specific examples of the hydroquinone compound include monomethyl ether hydroquinone. Specific examples of the amine compound include N-nitroso-N-phenylhydroxylamine, N,N-diethylhydroxylamine, and the like. One kind of these polymerization inhibitors may be used singly, or two or more kinds thereof may be used in combination.

A content of the polymerization inhibitor is, with respect to a total mass of the ion exchange membrane that is 100 part by mass, preferably 0.0001 to 5 parts by mass, more preferably 0.001 to 1 part by mass, and even more preferably 0.01 to 0.5 parts by mass.

(Method for Manufacturing Ion Exchange Membrane)

A method for manufacturing an ion exchange membrane of the present invention is not particularly limited, and examples thereof include a method of copolymerizing at least a difunctional styrene compound corresponding to the constitutional unit represented by Formula 1 and an amino group-containing ethylenically unsaturated compound, a method of manufacturing leaving group-containing polystyrene and then reacting the polystyrene with a specific amine compound, and the like.

Particularly, from the viewpoint of simplicity, costs, and ease of controlling the number of amino groups, the method for manufacturing an ion exchange membrane of the present invention is preferably a manufacturing method including a membrane preparation step of preparing a membrane containing a resin having a constitutional unit represented by Formula 3 and a reaction step of reacting the membrane with an amine compound represented by Formula 4.

Furthermore, it is preferable that the ion exchange membrane of the present invention is manufactured by the above method.

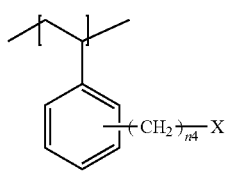

(3)

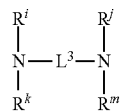

(4)

In Formulae 3 and 4, n4 represents an integer of 1 to 10, X represents a leaving group, $L^3$ represents an alkylene group or an alkenylene group, $R^i$, $R^j$, $R^k$, and $R^m$ each independently represent an alkyl group or an aryl group, and $R^i$ and $R^j$ and/or $R^k$ and $R^m$ may form a ring by being bonded to each other.

Formula 3 in the method for manufacturing an ion exchange membrane of the present invention is the same as Formula 3 described above, and preferred aspects of n4 and X are also the same.

$L^3$, $R^i$, $R^j$, $R^k$, and $R^m$ in Formula 4 have the same definition as $L^1$, $R^a$, $R^b$, $R^c$, and $R^d$ in Formula 1 respectively, and preferred aspects thereof are also the same.

<Membrane Preparation Step>

The method for manufacturing an ion exchange membrane of the present invention preferably includes a membrane preparation step of preparing a membrane containing a resin having a constitutional unit represented by Formula 3.

The resin having a constitutional unit represented by Formula 3 is preferably formed by polymerizing a composition containing a compound represented by Formula 5 and a polymerization initiator.

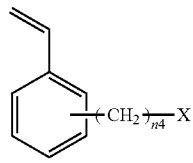

(5)

In Formula 5, n4 represents an integer of 1 to 10, and X represents a leaving group.

n4 and X in Formula 5 have the same definition as n4 and X in Formula 3, and preferred aspects thereof are also the same.

The aforementioned composition may contain an ethylenically unsaturated compound in addition to the compound represented by Formula 5. As the ethylenically unsaturated compound, a known ethylenically unsaturated compound can be used, and the ethylenically unsaturated compound may be monofunctional or polyfunctional. It is particularly preferable that the composition contains a polyfuncitonal ethylenically unsaturated compound.

The polyfunctional ethylenically unsaturated compound functions as a cross-linking gent, and examples thereof preferably include divinyl benzene, divinyl biphenyl, divinyl naphthalene, and the like.

The composition preferably contains a polymerization initiator. The polymerization initiator is preferably a thermal polymerization initiator, and more preferably a thermal radical polymerization initiator.

Examples of the thermal radical polymerization initiator preferably include an organic peroxide and an azo compound, and particularly preferably include an organic peroxide.

Examples of the organic peroxide include benzoyl peroxide, di-t-butyl peroxide, t-butyl peroxy-2-ethyl hexanoate, and the like.

Examples of the azo compound include 2,2'-azobisisobutyronitrile, 2,2'-azobispropionitrile, 2,2'-azobis(2,4-dimethylvaleronitrile), and the like.

The composition may also contain a known additive such as a polymerization inhibitor.

In the membrane preparation step, the composition containing the compound represented by Formula 5 and a polymerization initiator preferably does not contain an organic solvent, or a content of an organic solvent in the composition is preferably greater than 0% by mass and equal to or less than 1% by mass. The composition more preferably does not contain water, a water-soluble solvent, and a water-insoluble organic solvent, or a total content of water, a water-soluble solvent, and a water-insoluble organic solvent in the composition is more preferably greater than 0% by mass and equal to or less than 1% by mass. The composition even more preferably does not contain water, a water-soluble solvent, and a water-insoluble organic solvent. If the above aspect is adopted, the defect of the obtained membrane is further reduced, and the physical strength of the obtained membrane is further improved.

It is preferable that the compound represented by Formula 5 is a liquid at 25° C. If this aspect is adopted, the compound represented by Formula 5 can also function as a solvent, the defect of the obtained membrane is further reduced, and the physical strength of the obtained membrane is further improved.

In the membrane preparation step, the method for preparing a membrane containing the resin having the constitutional unit represented by Formula 3 is not particularly limited. For example, the membrane can be prepared by a batch process (batch method) by using a fixed support or by a continuous process (continuous method) by using a moving support. The support may be in the form of a roll that is continuously rewound. In a case of a continuous method, by loading a support on a belt that is being continuously moved, it is possible to perform a step of continuously coating the support with a coating solution as a composition for forming a membrane and a step of forming a membrane by polymerizing and curing the composition. Here, only one of the coating step and the membrane forming step may be continuously performed.

Until the polymerization and curing reaction is finished after the porous support is dipped into the composition for forming a membrane, a temporary support may also be used in addition to the support (after the polymerization and curing reaction is finished, the membrane is peeled off from the temporary support). For the temporary support, the permeation of a substance does not need to be considered, and for example, any material including a polyethylene terephthalate (PET) film or a metal plate such as an aluminum plate can be used as long as the material can be fixed for forming a membrane.

Furthermore, after the porous support is dipped into the composition for forming a membrane, the composition can be polymerized and cured without using a support other than the porous support.

The porous support can be coated with and dipped into the composition for forming a membrane by various coating or dipping methods such as curtain coating, slot die coating, extrusion coating, air knife coating, slide coating, nip roll coating, forward roll coating, reverse roll coating, dip coating, kiss coating, rod bar coating, or spray coating. A plurality of layers can be simultaneously or continuously coated. For simultaneously coating multiple layers, curtain coating, slide coating, slot die coating, or extrusion coating is preferable.

Particularly, in the membrane preparation step, a membrane is preferably formed by coating or impregnating a support with the composition containing the compound represented by Formula 5 and a polymerization initiator and polymerizing the composition, and more preferably formed by coating or impregnating a support with the composition containing the compound represented by Formula 5 and a thermal polymerization initiator, then interposing the support between temporary supports such that both sides of the support are covered, and polymerizing the composition by heating in the interposed state. After polymerization, the temporary support should be peeled off at a predetermined timing.

The conditions of thermal polymerization by heating in the membrane preparation step are not particularly limited. The heating temperature is preferably 40° C. to 120° C., more preferably 60° C. to 100° C., and even more preferably 75° C. to 90° C., and the heating time is preferably 1 minute to 12 hours, more preferably 1 minute to 8 hours, and even more preferably 1 minute to 6 hours.

<Reaction Step>

It is preferable that the method for manufacturing an ion exchange membrane of the present invention includes a reaction step of reacting the membrane obtained through the membrane preparation step with the amine compound represented by Formula 4.

In the reaction step, by reacting the resin represented by Formula 3 with the amine compound represented by Formula 4, the resin having the constitutional unit represented by Formula 1 and the constitutional unit represented by Formula 2 can be easily prepared. In the reaction step, an amino group in the amine compound represented by Formula 4 reacts with a leaving group of the resin represented by Formula 3. As a result, the leaving group X leaves as an anion, and the amino group becomes an ammonium structure.

If both of two amino groups of the amine compound represented by Formula 4 react, the constitutional unit represented by Formula 1 is formed, and if only one of the two amino groups reacts, the constitutional unit represented by Formula 2 is formed.

By selecting the amount of the used amine compound represented by Formula 4, the concentration of the solution into which the support is to be dipped, the reaction conditions, and the like, the number of amino groups in the obtained ion exchange membrane can be easily controlled.

The reaction step is preferably a step of causing a reaction by dipping the membrane obtained through the membrane forming step into a solution of the amine compound represented by Formula 4.

Examples of a solvent of the solution of the amine compound represented by Formula 4 include water and/or a water-soluble solvent. The solvent is preferably an alcohol compound, more preferably an alcohol compound having 1 to 3 carbon atoms, and even more preferably methanol.

The dipping temperature is preferably 0° C. to 60° C., more preferably 0° C. to 40° C., and even more preferably 10° C. to 35° C.

The dipping time is preferably 1 minute to 24 hours, and more preferably 1 minute to 12 hours.

The concentration of the amine compound represented by Formula 4 in the solution of the amine compound represented by Formula 4 is preferably 0.5% to 20% by mass, more preferably 1% to 15% by mass, and even more preferably 2% to 12% by mass.

Examples of the compound represented by Formula 4 that is used in the reaction step preferably include 1,4-diazabicyclo[2.2.2]octane, 2-methyl-1,4-diazabicyclo[2.2.2]octane, N,N'-dimethylpiperazine, N,N'-dimethyl-1H,4H-dihydropyrazine, N,N,N',N'-tetram ethyl -1,3-diaminoprop ane, and N-ethyl-N,N',N'-trimethyl-1,3-diaminopropane. Among these, 1,4-diazabicyclo[2.2.2]octane and 2-methyl-1,4-di azabi cycl o[2.2.2]octane are more preferable, and 1,4-diazabicyclo[2.2.2]octane is particularly preferable.

The solution of the amine compound represented by Formula 4 may contain other amine compounds different from the amine compound represented by Formula 4.

Other amine compounds are preferably monovalent amine compounds, more preferably monovalent tertiary amine compounds, and even more preferably trialkyl amine. As the monovalent amine compounds, primary amine compounds or secondary amine compounds may be used.

A content of other amine compounds in the solution is preferably smaller than the cotnent of of the amine compound represented by Formula 4.

The ion exchange membrane of the present invention will be mainly used for ion exchange in particular.

However, the use of the ion exchange membrane of the present invention is not limited to ion exchange, and it is considered that the ion exchange membrane of the present invention can be suitably used for forward osmosis, reverse osmosis, and gas separation.

The ion exchange membrane of the present invention can be suitably used for electrodeionization, continuous electrodeionization, electrodialysis, electrodialysis reversal, and the like.

(Module and Device)

A module (referred to as a "stack" as well) of the present invention is a module including the ion exchange membrane of the present invention. The module of the present invention is preferably a module in which an anion exchange membrane and a cation exchange membrane are alternately disposed between a pair of electrodes, and which includes at least the ion exchange membrane of the present invention as the anion exchange membrane and/or the cation exchange membrane.

A device of the present invention is a device including the ion exchange membrane of the present invention. The device of the present invention is preferably a device used for the aforementioned purpose.

In the module of the present invention and the device of the present invention, portions other than the ion exchange membrane of the present invention are not particularly limited. For example, in the portions, known constitutional parts, structures, or means used for purposes such as ion exchange, forward osmosis, reverse osmosis, gas separation, electrodeionization, continuous electrodeionization, electrodialysis, and electrodialysis reversal described above can be used.

EXAMPLES

Hereinafter, the present invention will be more specifically explained by describing examples. The materials, the amount and proportion of the materials used, treatment contents, treatment procedure, and the like described in the following examples can be appropriately changed within a scope that does not depart from the gist of the present invention. Therefore, the scope of the present invention is not limited to the following specific examples. Herein, unless otherwise specified, "part" and "%" are based on mass.

Examples 1 to 46 and Comparative Examples 1 to 29

<Membrane Preparation Step>

In each example and comparative example, a support shown in Tables 1 to 13 was coated with a composition for forming a membrane shown in Tables 1 to 13, both sides of the support were covered with a polyethylene terephthalate film (manufactured by TORAY INDUSTRIES, INC., LUMIRROR T60), and the support was heated at a temperature for a time shown in Tables 1 to 13 such that a polymerization and curing reaction occurred, thereby preparing a membrane.

<Reaction Step>

In each example and comparative example, the polyethylene terephthalate film was peeled off from both sides of the membrane obtained as above, and the membrane was dipped into a post-treatment solution shown in Tables 1 to 13 at a temperature for a time shown in Tables 1 to 13, thereby preparing an ion exchange membrane.

<Number of Amino Groups (Amount of Amino Groups Introduced) and Evaluation>

The obtained ion exchange membrane was evaluated in terms of the following items. The evaluation results are summarized in the following Tables 1 to 13.

<Measurement of Ion Exchange Capacity>

An ion exchange capacity was measured according to the method described in Hymenology experimental method (ISBN 978-4-906126-09-5) p. 194.

<Quantification of Number of Amino Groups>

First, by the aforementioned method, an ion exchange capacity of the membrane was measured and taken as the number of quaternary ammonium groups per mass of the dry membrane. Then, according to the method described in US2012/0165419A, a total number of quaternary ammonium groups and amino groups per mass of the dry membrane was determined. From the obtained number, the number of quaternary ammonium groups was subtracted, and the result was taken as the number of amino groups.

<Evaluation of Defect of Membrane>

The membrane was cut in a size of 10 cm×10 cm. In a case where the membrane was wet, the membrane was wiped with dry filter paper and then placed on paper. One surface of the membrane was thoroughly and gently tapped with a sponge wet with a methanol solution containing a dye. In a case where the paper was not stained with the dye passing through the membrane, a defect of the membrane was evaluated to be 1, and in a case where the paper was stained with the dye, a defect of the membrane was evaluated to be 2.

<Evaluation of Mechanical Strength of Membrane (Defect of Membrane having Undergone Bending)>

The membrane was cut in a size of 10 cm×10 cm and fold at a right angle to a straight line parallel to one side of the membrane. Then, a mechanical strength of the membrane was evaluated according to the same method and same evaluation criteria as in the evaluation of defect described above.

<Measurement of Membrane Performance>

Regarding the following evaluation of electrical resistance and water permeability, the membrane having undergone measurement was evaluated in terms of defect, and the measurement results obtained from the membrane not having a defect were adopted. In a case where the membrane was found to have a defect, a process of cutting off another region of the membrane, measuring the membrane again, and evaluating a defect was repeated until data of a membrane not having a defect was obtained.

The smaller the product of the electrical resistance and the water permeability, the higher the performance of the ion exchange membrane.

—Measurement of Electrical Resistance ER ($\Omega \cdot cm^2$) of Membrane—

Both surfaces of a membrane dipped into a 0.5 M aqueous NaCl solution for about 2 hours was wiped with dry filter paper, and the membrane was inserted into a double-chamber cell (effective membrane area: 1 $cm^2$, a Ag/AgCl reference electrode (manufactured by Metrohm AG) was used as an electrode). Both chambers were filled with 100 mL of NaCl at the same concentration, and the cell was left in a thermostatic water bath with a temperature of 25° C. until equilibrium was established. After the temperature of the solution in the cell exactly became 25° C., an electrical resistance r1 was measured using an alternating current bridge (frequency: 1,000 Hz). Then, the membrane was removed, and an electrical resistance r2 between both of the electrodes containing only the 0.5 M aqueous NaCl solution was measured, and an electrical resistance r of the membrane was determined by r1-r2. The obtained result was taken as an electrical resistance ER of the membrane. The smaller the value of the electrical resistance, the more the membrane is preferable as an ion exchange membrane.

—Measurement of Water Permeability WP (mL/($m^2 \cdot Pa \cdot hr$))—

A water permeability of the membrane was measured using a device having a flow channel 10 shown in FIG. 1. In FIG. 1, the reference 1 represents a membrane, and the references 3 and 4 represent flow channels of a feed solution (pure water) and a draw solution (3 M aqueous NaCl solution) respectively. The arrow indicated by the reference 2 represents the flow of water separated from the feed solution.

400 mL of the feed solution and 400 mL of the draw solution were brought into contact with each other through the membrane (membrane contact area: 18 cm$^2$). Each of the solutions was caused to flow at a flow rate of 0.11 cm/sec by using a peristaltic pump in a direction of the arrow indicated by the reference 5. The speed at which water in the feed solution passed into the draw solution through the membrane was analyzed by measuring a mass of the feed solution and the draw solution in real time, thereby determining a water permeability. The smaller the value of water permeability, the more the membrane is preferable as an ion exchange membrane.

The values shown in Tables 1 to 13 are values multiplied by $10^5$. For example, the measurement value of Example 1 is $9.7 \times 10^{-5}$ (mL/(m$^2$·Pa·hr)).

—Product of Electrical Resistance and Water Permeability—

A product of the value of the electrical resistance and the value of the water permeability (multiplied by $10^5$) was calculated.

<Evaluation of Performance Retention rate after Bending>

First, the product of the electrical resistance and the water permeability calculated as above was taken as a product of the electrical resistance and the water permeability before bending.

Then, an electrical resistance and a water permeability were measured in the same manner as described above, except that a membrane having undergone bending was used, and a product thereof was calculated in the same manner as described above. Thereafter, a defect of the membrane having undergone measurement was evaluated.

The product of the electrical resistance and the water permeability before bending that was calculated as above and the product of the electrical resistance and the water permeability after bending were evaluated according to the following evaluation criteria based on a value determined by the following equation.

Equation (unit: %): 100×(product of electrical resistance and water permeability before bending)/(product of electrical resistance and water permeability after bending)

A: equal to or greater than 85% and equal to or less than 100%
B: equal to or greater than 70% and less than 85%
C: equal to or greater than 55% and less than 70%
D: equal to or greater than 40% and less than 55%
E: equal to or greater than 0% and less than 40%

TABLE 1

| | | Example 1 | Example 2 | Example 3 | Example 4 | Example 5 | Example 6 | Example 7 |
|---|---|---|---|---|---|---|---|---|
| Composition for forming membrane | Divinyl benzene | 3 | 3 | 3 | 3 | 3 | 3 | 2 |
| | Chloromethylstyrene | 95.5 | 95.5 | 95.5 | 95.5 | 95.5 | 95.5 | 96.5 |
| | Benzoyl peroxide | 1.5 | 1.5 | 1.5 | 1.5 | 1.5 | 1.5 | 1.5 |
| | Support | 2223-10 | 2223-10 | 2223-10 | 2223-10 | 2223-10 | 2223-10 | 2223-10 |
| | Polymerization condition | 80° C., 4 hours | 80° C., 4 hours | 80° C., 4 hours | 80° C., 4 hours | 80° C., 4 hours | 80° C., 4 hours | 80° C., 4 hours |
| Post-treatment solution | Methanol | 89 | 90.5 | 92 | 93 | 96 | 90 | 90 |
| | DABCO | 11 | 9.5 | 8 | 7 | 4 | 8 | 10 |
| | Trimethylamine | — | — | — | — | — | 2 | — |
| | Dipping condition | 25° C., 4 hours | 25° C., 4 hours | 25° C., 4 hours | 25° C., 4 hours | 25° C., 4 hours | 25° C., 4 hours | 25° C., 4 hours |
| Proportion of constitutional unit represented by Formula 1 in ion exchange resin (% by mass) | | 16.6 | 48.1 | 65.8 | 74.7 | 89.6 | 59.7 | 18.2 |
| Proportion of constitutional unit represented by Formula 2 in ion exchange resin (% by mass) | | 78.9 | 47.4 | 29.7 | 20.8 | 5.9 | 24.1 | 78.3 |
| Proportion of other constitutional units in ion exchange resin (% by mass) | | 4.5 | 4.5 | 4.5 | 4.5 | 4.5 | 16.2 | 3.5 |
| Defect of membrane | | 1 | 1 | 1 | 1 | 1 | 1 | 1 |
| Defect of membrane after bending | | 1 | 1 | 1 | 1 | 1 | 1 | 1 |
| Performance retention rate after bending | | B | A | A | B | B | A | B |
| Number of amino groups per dry mass (mmol/g) | | 2.39 | 1.33 | 0.80 | 0.55 | 0.15 | 0.65 | 2.36 |
| Electrical resistance (Ω·cm$^2$) | | 0.9 | 1.2 | 1.8 | 2.0 | 2.3 | 1.6 | 1.0 |
| Water permeability (×$10^{-5}$ mL/(m$^2$·Pa·hr)) | | 9.7 | 6.2 | 3.7 | 3.4 | 3.4 | 4.5 | 8.8 |
| Product of electrical resistance and water permeability | | 8.73 | 7.44 | 6.66 | 6.80 | 7.82 | 7.20 | 8.80 |

TABLE 2

| | | Example 8 | Example 9 | Example 10 | Example 11 | Example 12 | Example 13 | Example 14 |
|---|---|---|---|---|---|---|---|---|
| Composition for forming membrane | Divinyl benzene | 2 | 2 | 4.5 | 4.5 | 4.5 | 3 | 3 |
| | Chloromethylstyrene | 96.5 | 96.5 | 94 | 94 | 94 | 95.5 | 95.5 |
| | Benzoyl peroxide | 1.5 | 1.5 | 1.5 | 1.5 | 1.5 | 1.5 | 1.5 |
| | Support | 2223-10 | 2223-10 | 2223-10 | 2223-10 | 2223-10 | 2223-10 | 2223-10 |
| | Polymerization condition | 80° C., 4 hours | 80° C., 4 hours | 80° C., 4 hours | 80° C., 4 hours | 80° C., 4 hours | 80° C., 4 hours | 80° C., 4 hours |

TABLE 2-continued

|  |  | Example 8 | Example 9 | Example 10 | Example 11 | Example 12 | Example 13 | Example 14 |
|---|---|---|---|---|---|---|---|---|
| Post-treatment solution | Methanol | 93 | 96.5 | 88.5 | 91.5 | 95 | 89.5 | 92.5 |
|  | DABCO | 7 | 3.5 | 11.5 | 8.5 | 5 | — | — |
|  | N,N'-dimethylpiperazine | — | — | — | — | — | 10.5 | 7.5 |
|  | Dipping condition | 25° C., 4 hours | 25° C., 4 hours | 25° C., 4 hours | 25° C., 4 hours | 25° C., 4 hours | 25° C., 4 hours | 25° C., 4 hours |
| Proportion of constitutional unit represented by Formula 1 in ion exchange resin (% by mass) |  | 68.5 | 89.1 | 15.2 | 62.7 | 87.0 | 16.9 | 64.4 |
| Proportion of constitutional unit represented by Formula 2 in ion exchange resin (% by mass) |  | 28.0 | 7.4 | 78.8 | 31.3 | 7.0 | 78.6 | 31.1 |
| Proportion of other constitutional units in ion exchange resin (% by mass) |  | 3.5 | 3.5 | 6.0 | 6.0 | 6.0 | 4.5 | 4.5 |
| Defect of membrane |  | 1 | 1 | 1 | 1 | 1 | 1 | 1 |
| Defect of membrane after bending |  | 1 | 1 | 1 | 1 | 1 | 1 | 1 |
| Performance retention rate after bending |  | A | B | A | A | B | B | A |
| Number of amino groups per dry mass (mmol/g) |  | 0.75 | 0.19 | 2.40 | 0.85 | 0.18 | 2.38 | 0.84 |
| Electrical resistance ($\Omega \cdot cm^2$) |  | 1.9 | 2.2 | 1.0 | 1.9 | 2.4 | 1.1 | 2.0 |
| Water permeability ($\times 10^{-5}$ mL/($m^2 \cdot$ Pa $\cdot$ hr)) |  | 3.5 | 3.3 | 8.9 | 3.6 | 3.3 | 8.9 | 4.6 |
| Product of electrical resistance and water permeability |  | 6.65 | 7.26 | 8.90 | 6.84 | 7.92 | 9.79 | 9.20 |

TABLE 3

|  |  | Example 15 | Example 16 | Example 17 | Example 18 | Example 19 | Example 20 | Example 21 |
|---|---|---|---|---|---|---|---|---|
| Composition for forming membrane | Divinyl benzene | 3 | 3 | 3 | 3 | — | — | — |
|  | Chloromethylstyrene | 95.5 | 95.5 | 95.5 | 95.5 | 94.5 | 94.5 | 94.5 |
|  | Divinyl biphenyl | — | — | — | — | 4 | 4 | 4 |
|  | Benzoyl peroxide | 1.5 | 1.5 | 1.5 | 1.5 | 1.5 | 1.5 | 1.5 |
|  | Support | 2223-10 | 2223-10 | 2223-10 | 2223-10 | 2223-10 | 2223-10 | 2223-10 |
|  | Polymerization condition | 80° C., 4 hours | 80° C., 4 hours | 80° C., 4 hours | 80° C., 4 hours | 80° C., 4 hours | 80° C., 4 hours | 80° C., 4 hours |
| Post-treatment solution | Methanol | 96 | 91 | 93.5 | 97 | 89 | 92 | 96 |
|  | DABCO | — | — | — | — | 11 | 8 | 4 |
|  | N,N'-dimethylpiperazine | 4 | — | — | — | — | — | — |
|  | N,N,N',N'-tetramethyl-yl-1,3-diaminopropane | — | 9 | 6.5 | 3 | — | — | — |
|  | Dipping condition | 25° C., 4 hours | 25° C., 4 hours | 25° C., 4 hours | 25° C., 4 hours | 25° C., 4 hours | 25° C., 4 hours | 25° C., 4 hours |
| Proportion of constitutional unit represented by Formula 1 in ion exchange resin (% by mass) |  | 89.2 | 15.3 | 61.9 | 87.3 | 15.4 | 62.9 | 87.8 |
| Proportion of constitutional unit represented by Formula 2 in ion exchange resin (% by mass) |  | 6.3 | 80.2 | 33.6 | 8.2 | 79.1 | 31.6 | 6.7 |
| Proportion of other constitutional units in ion exchange resin (% by mass) |  | 4.5 | 4.5 | 4.5 | 4.5 | 5.5 | 5.5 | 5.5 |
| Defect of membrane |  | 1 | 1 | 1 | 1 | 1 | 1 | 1 |
| Defect of membrane after bending |  | 1 | 1 | 1 | 1 | 1 | 1 | 1 |
| Performance retention rate after bending |  | B | B | A | B | B | A | B |
| Number of amino groups per dry mass (mmol/g) |  | 0.16 | 2.35 | 0.87 | 0.20 | 2.36 | 0.84 | 0.17 |
| Electrical resistance ($\Omega \cdot cm^2$) |  | 2.5 | 1.2 | 2.3 | 2.7 | 0.9 | 1.7 | 2.2 |
| Water permeability ($\times 10^{-5}$ mL/($m^2 \cdot$ Pa $\cdot$ hr)) |  | 3.9 | 9.1 | 4.5 | 4.0 | 9.9 | 4.1 | 3.6 |
| Product of electrical resistance and water permeability |  | 9.75 | 10.92 | 10.35 | 10.80 | 8.91 | 6.97 | 7.92 |

TABLE 4

|  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Composition for forming membrane | Divinyl benzene | 20 | 3 | 3 | 2 | 2 | 4.5 | 4.5 |
|  | Chloromethylstyrene | — | 95.5 | 95.5 | 96.5 | 96.5 | 94 | 94 |
|  | (4-Vinylbenzyl)dimethyl [2-(dimethylamino)ethyl] ammonium chloride | 36.5 | — | — | — | — | — | — |
|  | NMP | 28 | — | — | — | — | — | — |
|  | Water | 14 | — | — | — | — | — | — |

TABLE 4-continued

|  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
|  | Benzoyl peroxide | 1.5 | 1.5 | 1.5 | 1.5 | 1.5 | 1.5 | 1.5 |
|  | Support | 2223-10 | 2223-10 | 2223-10 | 2223-10 | 2223-10 | 2223-10 | 2223-10 |
|  | Polymerization condition | 80° C., 4 hours | 80° C., 4 hours | 80° C., 4 hours | 80° C., 4 hours | 80° C., 4 hours | 80° C., 4 hours | 80° C., 4 hours |
| Post-treatment solution | Methanol | Dipping treatment was not performed | 88.5 | 96.5 | 88 | 97.5 | 87.5 | 97 |
|  | DABCO |  | 11.5 | 3.5 | 12 | 2.5 | 12.5 | 3 |
|  | N,N'-dimethylpiperazine |  | — | — | — | — | — | — |
|  | N,N,N',N'-tetramethyl-1,3-diaminopropane |  | — | — | — | — | — | — |
|  | Dipping condition |  | 25° C., 4 hours | 25° C., 4 hours | 25° C., 4 hours | 25° C., 4 hours | 25° C., 4 hours | 25° C., 4 hours |
| Proportion of constitutional unit represented by Formula 1 in ion exchange resin (% by mass) |  | 0.0 | 13.6 | 91.6 | 13.3 | 91.8 | 11.7 | 89.7 |
| Proportion of constitutional unit represented by Formula 2 in ion exchange resin (% by mass) |  | 62.9 | 81.9 | 3.9 | 83.2 | 4.7 | 82.3 | 4.3 |
| Proportion of other constitutional units in ion exchange resin (% by mass) |  | 37.1 | 4.5 | 4.5 | 3.5 | 3.5 | 6.0 | 6.0 |
| Defect of membrane |  | 2 | 2 | 2 | 2 | 2 | 2 | 2 |
| Defect of membrane after bending |  | 2 | 2 | 2 | 2 | 2 | 2 | 2 |
| Performance retention rate after bending |  | E | C | E | C | E | D | E |
| Number of amino groups per dry mass (mmol/g) |  | 1.6 | 2.5 | 0.1 | 2.54 | 0.12 | 2.53 | 0.11 |
| Electrical resistance ($\Omega \cdot cm^2$) |  | 5.1 | 0.9 | 3.0 | 0.8 | 2.4 | 0.9 | 2.7 |
| Water permeability ($\times 10^{-5}$ mL/($m^2 \cdot Pa \cdot hr$)) |  | 12.6 | 19.0 | 5.4 | 22.4 | 7.0 | 21.5 | 8.5 |
| Product of electrical resistance and water permeability |  | 64.26 | 16.15 | 16.20 | 17.92 | 16.80 | 19.35 | 22.95 |

TABLE 5

|  |  | Comparative Example 8 | Comparative Example 9 | Comparative Example 10 | Comparative Example 11 | Comparative Example 12 | Comparative Example 13 |
|---|---|---|---|---|---|---|---|
| Composition for forming membrane | Divinyl benzene | 3 | 3 | 3 | 3 | — | — |
|  | Chloromethylstyrene | 95.5 | 95.5 | 95.5 | 95.5 | 94.5 | 94.5 |
|  | Divinyl biphenyl | — | — | — | — | 4 | 4 |
|  | Benzoyl peroxide | 1.5 | 1.5 | 1.5 | 1.5 | 1.5 | 1.5 |
|  | Support | 2223-10 | 2223-10 | 2223-10 | 2223-10 | 2223-10 | 2223-10 |
|  | Polymerization condition | 80° C., 4 hours | 80° C., 4 hours | 80° C., 4 hours | 80° C., 4 hours | 80° C., 4 hours | 80° C., 4 hours |
| Post-treatment solution | Methanol | 88 | 97.5 | 89 | 98 | 88 | 97 |
|  | DABCO | — | — | — | — | 12 | 3 |
|  | N,N'-dimethylpiperazine | 12 | 2.5 | — | — | — | — |
|  | N,N,N',N'-tetramethyl-1,3-diaminopropane | — | — | 11 | 2 | — | — |
|  | Dipping condition | 25° C., 4 hours | 25° C., 4 hours | 25° C., 4 hours | 25° C., 4 hours | 25° C., 4 hours | 25° C., 4 hours |
| Proportion of constitutional unit represented by Formula 1 in ion exchange resin (% by mass) |  | 12.0 | 90.8 | 10.9 | 90.1 | 10.4 | 89.7 |
| Proportion of constitutional unit represented by Formula 2 in ion exchange resin (% by mass) |  | 83.5 | 4.7 | 84.6 | 5.4 | 84.1 | 4.8 |
| Proportion of other constitutional units in ion exchange resin (% by mass) |  | 4.5 | 4.5 | 4.5 | 4.5 | 5.5 | 5.5 |
| Defect of membrane |  | 2 | 2 | 2 | 2 | 2 | 2 |
| Defect of membrane after bending |  | 2 | 2 | 2 | 2 | 2 | 2 |
| Performance retention rate after bending |  | C | E | C | E | C | E |
| Number of amino groups per dry mass (mmol/g) |  | 2.56 | 0.12 | 2.51 | 0.13 | 2.54 | 0.12 |
| Electrical resistance ($\Omega \cdot cm^2$) |  | 1.1 | 2.8 | 1.2 | 3.0 | 0.9 | 2.2 |
| Water permeability ($\times 10^{-5}$ mL/($m^2 \cdot Pa \cdot hr$)) |  | 24.0 | 7.0 | 19.8 | 7.6 | 24.5 | 8.4 |
| Product of electrical resistance and water permeability |  | 26.40 | 19.60 | 23.76 | 22.80 | 22.05 | 18.48 |

TABLE 6

|  |  | Comparative Example 14 | Comparative Example 15 | Comparative Example 16 | Comparative Example 17 |
|---|---|---|---|---|---|
| Composition for forming | Divinyl benzene | 2 | The solution described in | 15 | 12 |
|  | Chloromethylstyrene | 22.5 |  | 70 | 3 |

TABLE 6-continued

|  |  | Comparative Example 14 | Comparative Example 15 | Comparative Example 16 | Comparative Example 17 |
|---|---|---|---|---|---|
| membrane | Styrene | — | paragraph "0137" of JP2009-193957A was concentrated to obtain a compound, the compound was dissolved again in pure water such that the amount thereof became 50% by mass, and then a polymerization initiator AIBN was added in an amount of 1% by mass, thereby preparing a composition. | 5 | — |
|  | Styrene oxide | — |  | 5 | — |
|  | Hydrogenated styrene-isoprene triblock copolymer | — |  | 15 | — |
|  | Dimethylaminoethyl methacrylate (DMAEMA) | — |  | — | 10 |
|  | Vinyl benzyl trimethylammonium chloride | 35 |  | — | — |
|  | NMP | 26 |  | — | — |
|  | Water | 13 |  | — | — |
|  | Benzoyl peroxide | 1.5 |  | — | — |
|  | Di-tert-butyl peroxide | — |  | 15 | — |
|  | t-butyl peroxy-2-ethylhexanoate | — |  | — | 0.5 |
|  | Support | 2223-10 |  | 2223-10 | 2223-10 |
|  | Polymerization condition | 80° C., 4 hours | 80° C., 4 hours | Heated to 150° C. from 20° C. for 5 hours, and then kept at 150° C. for 5 hours | 90° C., 2 hours |
| Post-treatment solution | Methanol | 94 | Dipping treatment was not performed. | — | — |
|  | Acetone | — |  | 20 | — |
|  | Water | — |  | 70 | — |
|  | trimethylamine | 6 |  | 10 | — |
|  | 2N HCl | — |  | — | 100 |
|  | Dipping condition | 25° C., 4 hours |  | 30° C., 16 hours | 25° C., 8 hours |
| Proportion of constitutional unit represented by Formula 1 in ion exchange resin (% by mass) |  | 0.0 | Incalculable | 0.0 | 0.0 |
| Proportion of constitutional unit represented by Formula 2 in ion exchange resin (% by mass) |  | 0.0 | Incalculable | 0.0 | 0.0 |
| Proportion of other constitutional units in ion exchange resin (% by mass) |  | 100.0 | Incalculable | 100.0 | 100.0 |
| Defect of membrane |  | 2 | 1 | 1 | 2 |
| Defect of membrane after bending |  | 2 | 1 | 1 | 2 |
| Performance retention rate after bending |  | E | C | C | E |
| Number of amino groups per dry mass (mmol/g) |  | 1.20 | 0.05 | 0 | 1.46 |
| Electrical resistance ($\Omega \cdot cm^2$) |  | 4.3 | 0.7 | 2.3 | 17.0 |
| Water permeability ($\times 10^{-5}$ mL/($m^2 \cdot Pa \cdot hr$)) |  | 6.9 | 25.9 | 8.1 | 10.6 |
| Product of electrical resistance and water permeability |  | 29.67 | 18.13 | 18.63 | 180.20 |

TABLE 7

|  |  | Example 22 | Example 23 | Example 24 | Example 25 | Example 26 | Comparative Example 18 | Comparative Example 19 |
|---|---|---|---|---|---|---|---|---|
| Composition for forming membrane | Divinyl benzene | 3 | 3 | 3 | 3 | 3 | 3 | 3 |
|  | Chloromethylstyrene | 95.5 | 95.5 | 95.5 | 95.5 | 95.5 | 95.5 | 95.5 |
|  | Benzoyl peroxide | 1.5 | 1.5 | 1.5 | 1.5 | 1.5 | 1.5 | 1.5 |
|  | Support | 2226-14 | 2226-14 | 2226-14 | 2226-14 | 2226-14 | 2226-14 | 2226-14 |
|  | Polymerization condition | 80° C., 4 hours | 80° C., 4 hours | 80° C., 4 hours | 80° C., 4 hours | 80° C., 4 hours | 80° C., 4 hours | 80° C., 4 hours |
| Post-treatment solution | Methanol | 89 | 90.5 | 92 | 93 | 96 | 88.5 | 96.5 |
|  | DABCO | 11 | 9.5 | 8 | 7 | 4 | 11.5 | 3.5 |
|  | Dipping condition | 25° C., 4 hours | 25° C., 4 hours | 25° C., 4 hours | 25° C., 4 hours | 25° C., 4 hours | 25° C., 4 hours | 25° C., 4 hours |
| Proportion of constitutional unit represented by Formula 1 in ion exchange resin (% by mass) |  | 15.5 | 45.9 | 63.7 | 73.5 | 88.5 | 7.1 | 91.6 |
| Proportion of constitutional unit represented by Formula 2 in ion exchange resin (% by mass) |  | 80.0 | 49.6 | 31.8 | 22.0 | 7.0 | 88.4 | 3.9 |
| Proportion of other constitutional units in ion exchange resin (% by mass) |  | 4.5 | 4.5 | 4.5 | 4.5 | 4.5 | 4.5 | 4.5 |
| Defect of membrane |  | 1 | 1 | 1 | 1 | 1 | 2 | 2 |
| Defect of membrane after bending |  | 1 | 1 | 1 | 1 | 1 | 2 | 2 |
| Performance retention rate after bending |  | B | A | A | A | B | B | D |
| Number of amino groups per dry mass (mmol/g) |  | 2.17 | 1.25 | 0.77 | 0.52 | 0.16 | 2.45 | 0.09 |
| Electrical resistance ($\Omega \cdot cm^2$) |  | 1.5 | 2.0 | 3.0 | 3.3 | 3.8 | 1.4 | 5.2 |

TABLE 7-continued

|  | Example 22 | Example 23 | Example 24 | Example 25 | Example 26 | Comparative Example 18 | Comparative Example 19 |
|---|---|---|---|---|---|---|---|
| Water permeability (×10$^{-5}$ mL/(m$^2$ · Pa · hr)) | 5.9 | 3.9 | 2.3 | 2.1 | 2.1 | 12.0 | 3.3 |
| Product of electrical resistance and water permeability | 8.85 | 7.80 | 6.90 | 6.93 | 7.98 | 16.80 | 17.16 |

TABLE 8

| | | Example 27 | Example 28 | Example 29 | Example 30 | Example 31 | Comparative Example 20 | Comparative Example 21 |
|---|---|---|---|---|---|---|---|---|
| Composition for forming membrane | Divinyl benzene | 3 | 3 | 3 | 3 | 3 | 3 | 3 |
| | Chloromethylstyrene | 95.5 | 95.5 | 95.5 | 95.5 | 95.5 | 95.5 | 95.5 |
| | Benzoyl peroxide | 1.5 | 1.5 | 1.5 | 1.5 | 1.5 | 1.5 | 1.5 |
| | Support | 05HT-24 | 05HT-24 | 05HT-24 | 05HT-24 | 05HT-24 | 05HT-24 | 05HT-24 |
| | Polymerization condition | 80° C., 4 hours | 80° C., 4 hours | 80° C., 4 hours | 80° C., 4 hours | 80° C., 4 hours | 80° C., 4 hours | 80° C., 4 hours |
| Post-treatment solution | Methanol | 89 | 90.5 | 92 | 93 | 96 | 88.5 | 96.5 |
| | DABCO | 11 | 9.5 | 8 | 7 | 4 | 11.5 | 3.5 |
| | Dipping condition | 25° C., 4 hours | 25° C., 4 hours | 25° C., 4 hours | 25° C., 4 hours | 25° C., 4 hours | 25° C., 4 hours | 25° C., 4 hours |
| Proportion of constitutional unit represented by Formula 1 in ion exchange resin (% by mass) | | 10.7 | 42.7 | 61.8 | 70.7 | 88.2 | 5.7 | 91.2 |
| Proportion of constitutional unit represented by Formula 2 in ion exchange resin (% by mass) | | 84.8 | 52.8 | 33.7 | 24.8 | 7.3 | 89.8 | 4.3 |
| Proportion of other constitutional units in ion exchange resin (% by mass) | | 4.5 | 4.5 | 4.5 | 4.5 | 4.5 | 4.5 | 4.5 |
| Defect of membrane | | 1 | 1 | 1 | 1 | 1 | 2 | 2 |
| Defect of membrane after bending | | 1 | 1 | 1 | 1 | 1 | 2 | 2 |
| Performance retention rate after bending | | B | A | A | B | B | D | E |
| Number of amino groups per dry mass (mmol/g) | | 2.36 | 1.36 | 0.83 | 0.60 | 0.17 | 2.53 | 0.1 |
| Electrical resistance (Ω · cm$^2$) | | 0.7 | 0.8 | 1.2 | 1.3 | 1.5 | 0.6 | 2.0 |
| Water permeability (×10$^{-5}$ mL/(m$^2$ · Pa · hr)) | | 13.0 | 10.5 | 5.9 | 5.7 | 5.5 | 32.5 | 10.1 |
| Product of electrical resistance and water permeability | | 9.10 | 8.40 | 7.08 | 7.41 | 8.25 | 19.50 | 20.20 |

TABLE 9

| | | Example 32 | Example 33 | Example 34 | Comparative Example 22 | Comparative Example 23 |
|---|---|---|---|---|---|---|
| Composition for forming membrane | Divinyl benzene | 3 | 3 | 3 | 3 | 3 |
| | Chloromethylstyrene | 95.5 | 95.5 | 95.5 | 95.5 | 95.5 |
| | Benzoyl peroxide | 1.5 | 1.5 | 1.5 | 1.5 | 1.5 |
| | Support | 2223-10 | 2223-10 | 2223-10 | 2223-10 | 2223-10 |
| | Polymerization condition | 70° C., 12 hours | 70° C., 12 hours | 70° C., 12 hours | 70° C., 12 hours | 70° C., 12 hours |
| Post-treatment solution | Methanol | 90.5 | 92 | 93 | 88.5 | 96.5 |
| | DABCO | 9.5 | 8 | 7 | 11.5 | 3.5 |
| | Dipping condition | 25° C., 4 hours | 25° C., 4 hours | 25° C., 4 hours | 25° C., 4 hours | 25° C., 4 hours |
| Proportion of constitutional unit represented by Formula 1 in ion exchange resin (% by mass) | | 49.1 | 65.5 | 72.2 | 14.4 | 90.8 |
| Proportion of constitutional unit represented by Formula 2 in ion exchange resin (% by mass) | | 46.4 | 30.0 | 23.3 | 81.1 | 4.7 |
| Proportion of other constitutional units in ion exchange resin (% by mass) | | 4.5 | 4.5 | 4.5 | 4.5 | 4.5 |
| Defect of membrane | | 1 | 1 | 1 | 2 | 2 |
| Defect of membrane after bending | | 1 | 1 | 1 | 2 | 2 |
| Performance retention rate after bending | | B | A | B | C | D |
| Number of amino groups per dry mass (mmol/g) | | 1.30 | 0.81 | 0.62 | 2.47 | 0.12 |
| Electrical resistance (Ω · cm$^2$) | | 1.1 | 1.7 | 1.9 | 0.9 | 2.8 |
| Water permeability (×10$^{-5}$ mL/(m$^2$ · Pa · hr)) | | 6.8 | 3.9 | 3.6 | 18.7 | 6.0 |
| Product of electrical resistance and water permeability | | 7.48 | 6.63 | 6.84 | 16.83 | 16.80 |

TABLE 10

|  |  | Example 35 | Example 36 | Example 37 | Comparative Example 24 | Comparative Example 25 |
|---|---|---|---|---|---|---|
| Composition for forming membrane | Divinyl benzene | 3 | 3 | 3 | 3 | 3 |
|  | Chloromethylstyrene | 95.5 | 95.5 | 95.5 | 95.5 | 95.5 |
|  | Benzoyl peroxide | 1.5 | 1.5 | 1.5 | 1.5 | 1.5 |
|  | Support | 2223-10 | 2223-10 | 2223-10 | 2223-10 | 2223-10 |
|  | Polymerization condition | 90° C., 3 hours | 90° C., 3 hours | 90° C., 3 hours | 90° C., 3 hours | 90° C., 3 hours |
| Post-treatment solution | Methanol | 90.5 | 92 | 93 | 88.5 | 96.5 |
|  | DABCO | 9.5 | 8 | 7 | 11.5 | 3.5 |
|  | Dipping condition | 25° C., 4 hours | 25° C., 4 hours | 25° C., 4 hours | 25° C., 4 hours | 25° C., 4 hours |
| Proportion of constitutional unit represented by Formula 1 in ion exchange resin (% by mass) |  | 49.4 | 65.1 | 75.1 | 14.7 | 91.2 |
| Proportion of constitutional unit represented by Formula 2 in ion exchange resin (% by mass) |  | 46.1 | 30.4 | 20.4 | 80.8 | 4.3 |
| Proportion of other constitutional units in ion exchange resin (% by mass) |  | 4.5 | 4.5 | 4.5 | 4.5 | 4.5 |
| Defect of membrane |  | 1 | 1 | 1 | 2 | 2 |
| Defect of membrane after bending |  | 1 | 1 | 1 | 2 | 2 |
| Performance retention rate after bending |  | B | A | B | C | E |
| Number of amino groups per dry mass (mmol/g) |  | 1.29 | 0.82 | 0.54 | 2.46 | 0.11 |
| Electrical resistance ($\Omega \cdot cm^2$) |  | 1.2 | 1.9 | 2.0 | 1.0 | 3.1 |
| Water permeability ($\times 10^{-5}$ mL/($m^2 \cdot Pa \cdot hr$)) |  | 6.1 | 3.4 | 3.3 | 17.8 | 5.6 |
| Product of electrical resistance and water permeability |  | 7.32 | 6.46 | 6.60 | 17.80 | 17.36 |

TABLE 11

|  |  | Example 38 | Example 39 | Example 40 | Comparative Example 26 | Comparative Example 27 |
|---|---|---|---|---|---|---|
| Composition for forming membrane | Divinyl benzene | 3 | 3 | 3 | 3 | 3 |
|  | Chloromethylstyrene | 95.5 | 95.5 | 95.5 | 95.5 | 95.5 |
|  | Benzoyl peroxide | 1.5 | 1.5 | 1.5 | 1.5 | 1.5 |
|  | Support | 2223-10 | 2223-10 | 2223-10 | 2223-10 | 2223-10 |
|  | Polymerization condition | 80° C., 4 hours | 80° C., 4 hours | 80° C., 4 hours | 80° C., 4 hours | 80° C., 4 hours |
| Post-treatment solution | Methanol | 90.5 | 92 | 93 | 88.5 | 96.5 |
|  | DABCO | 9.5 | 8 | 7 | 11.5 | 3.5 |
|  | Dipping condition | 20° C., 12 hours | 20° C., 12 hours | 20° C., 12 hours | 20° C., 12 hours | 20° C., 12 hours |
| Proportion of constitutional unit represented by Formula 1 in ion exchange resin (% by mass) |  | 48.5 | 66.2 | 73.6 | 15.8 | 92.7 |
| Proportion of constitutional unit represented by Formula 2 in ion exchange resin (% by mass) |  | 47.0 | 29.3 | 21.9 | 79.7 | 2.8 |
| Proportion of other constitutional units in ion exchange resin (% by mass) |  | 4.5 | 4.5 | 4.5 | 4.5 | 4.5 |
| Defect of membrane |  | 1 | 1 | 1 | 2 | 2 |
| Defect of membrane after bending |  | 1 | 1 | 1 | 2 | 2 |
| Performance retention rate after bending |  | A | A | B | C | E |
| Number of amino groups per dry mass (mmol/g) |  | 1.32 | 0.79 | 0.58 | 2.42 | 0.07 |
| Electrical resistance ($\Omega \cdot cm^2$) |  | 1.2 | 1.8 | 2.1 | 1.0 | 2.9 |
| Water permeability ($\times 10^{-5}$ mL/($m^2 \cdot Pa \cdot hr$)) |  | 6.3 | 3.8 | 3.4 | 19.2 | 5.7 |
| Product of electrical resistance and water permeability |  | 7.56 | 6.84 | 7.14 | 19.20 | 16.53 |

TABLE 12

|  |  | Example 41 | Example 42 | Example 43 | Comparative Example 28 | Comparative Example 29 |
|---|---|---|---|---|---|---|
| Composition for forming membrane | Divinyl benzene | 3 | 3 | 3 | 3 | 3 |
|  | Chloromethylstyrene | 95.5 | 95.5 | 95.5 | 95.5 | 95.5 |
|  | Benzoyl peroxide | 1.5 | 1.5 | 1.5 | 1.5 | 1.5 |
|  | Support | 2223-10 | 2223-10 | 2223-10 | 2223-10 | 2223-10 |
|  | Polymerization condition | 80° C., 4 hours | 80° C., 4 hours | 80° C., 4 hours | 80° C., 4 hours | 80° C., 4 hours |
| Post-treatment solution | Methanol | 90.5 | 92 | 93 | 88.5 | 96.5 |
|  | DABCO | 9.5 | 8 | 7 | 11.5 | 3.5 |
|  | Dipping condition | 30° C., 3 hours | 30° C., 3 hours | 30° C., 3 hours | 30° C., 3 hours | 30° C., 3 hours |
| Proportion of constitutional unit represented by Formula 1 in ion exchange resin (% by mass) |  | 47.5 | 64.8 | 72.9 | 14.7 | 90.8 |
| Proportion of constitutional unit represented by Formula 2 in ion exchange resin (% by mass) |  | 48.0 | 30.7 | 22.6 | 80.8 | 4.7 |

TABLE 12-continued

|  | Example 41 | Example 42 | Example 43 | Comparative Example 28 | Comparative Example 29 |
|---|---|---|---|---|---|
| Proportion of other constitutional units in ion exchange resin (% by mass) | 4.5 | 4.5 | 4.5 | 4.5 | 4.5 |
| Defect of membrane | 1 | 1 | 1 | 2 | 2 |
| Defect of membrane after bending | 1 | 1 | 1 | 2 | 2 |
| Performance retention rate after bending | A | A | B | C | E |
| Number of amino groups per dry mass (mmol/g) | 1.35 | 0.83 | 0.60 | 2.46 | 0.12 |
| Electrical resistance ($\Omega \cdot cm^2$) | 1.1 | 1.7 | 1.9 | 1.0 | 3.2 |
| Water permeability ($\times 10^{-5}$ mL/($m^2 \cdot Pa \cdot hr$)) | 6.2 | 3.9 | 3.5 | 19.0 | 5.3 |
| Product of electrical resistance and water permeability | 6.82 | 6.63 | 6.65 | 19.00 | 16.96 |

TABLE 13

|  |  | Example 44 | Example 45 | Example 46 |
|---|---|---|---|---|
| Composition for forming membrane | Divinyl benzene | 3 | 3 | 2.8 |
|  | Chloromethylstyrene | — | — | 88.7 |
|  | Chloropropylstyrene | 95.5 | — | — |
|  | Bromobutylstyrene | — | 95.5 | — |
|  | Hydrogenated styrene-isoprene triblock copolymer | — | — | 7 |
|  | Benzoyl peroxide | 1.5 | 1.5 | 1.5 |
|  | Support | 2223-10 | 2223-10 | 2223-10 |
|  | Polymerization condition | 80° C., 4 hours | 80° C., 4 hours | 80° C., 4 hours |
| Post-treatment solution | Methanol | 92 | 92 | 92 |
|  | DABCO | 8 | 8 | 8 |
|  | Dipping condition | 25° C., 4 hours | 25° C., 4 hours | 25° C., 4 hours |
| Proportion of constitutional unit represented by Formula 1 in ion exchange resin (% by mass) |  | 67.9 | 69.0 | 64.7 |
| Proportion of constitutional unit represented by Formula 2 in ion exchange resin (% by mass) |  | 27.6 | 26.5 | 24.0 |
| Proportion of other constitutional units in ion exchange resin (% by mass) |  | 4.5 | 4.5 | 11.3 |
| Defect of membrane |  | 1 | 1 | 1 |
| Defect of membrane after bending |  | 1 | 1 | 1 |
| Performance retention rate after bending |  | A | A | A |
| Number of amino groups per dry mass (mmol/g) |  | 0.74 | 0.71 | 0.69 |
| Electrical resistance ($\Omega \cdot cm^2$) |  | 1.7 | 1.7 | 2.0 |
| Water permeability ($\times 10^{-5}$ mL/($m^2 \cdot Pa \cdot hr$)) |  | 3.9 | 3.8 | 3.4 |
| Product of electrical resistance and water permeability |  | 6.63 | 6.46 | 6.80 |

The unit of the numerical values in the column of each component of the composition for forming a membrane and the post-treatment solution in Tables 1 to 13 is part by mass.

The details of the compounds or supports used in examples and comparative examples are as below.

Divinyl benzene: manufactured by Wako Pure Chemical Industries, Ltd.

Chloromethylstyrene: CMS-P manufactured by AGC SEIMI CHEMICAL CO., LTD.

Chloropropylstyrene: manufactured by the method described in JP1999-60519A (JP-H11-60519A)

Bromobutylstyrene: manufactured by the method described in JP1999-60519A (JP-H11-60519A)

Divinyl biphenyl: synthesized by the methods described in JP2007-15925A, JP1996-3079A (JP-H08-3079A), and the like Styrene: manufactured by Wako Pure Chemical Industries, Ltd.

Styrene oxide: manufactured by Wako Pure Chemical Industries, Ltd.

Hydrogenated styrene-isoprene triblock copolymer: manufactured by ZEON CORPORATION Dimethylaminoethyl methacrylate: manufactured by Wako Pure Chemical Industries, Ltd.

DABCO: 1,4-diazabicyclo[2.2.2]octane, manufactured by Wako Pure Chemical Industries, Ltd.

Trimethylamine: manufactured by Alfa Aesar

Divinylbenzyl trimethylammonium chloride: manufactured by Sigma-Aldrich Co.

NMP: N-methyl-2-pyrrolidone, manufactured by Wako Pure Chemical Industries, Ltd.

Benzoyl peroixde: manufactured by NOF CORPORATION

Di-tert-butyl peroxide: manufactured by NOF CORPORATION t-Butyl peroxy-2-ethylhexanoate: manufactured by NOF CORPORATION Support 2223-10: non-woven cloth, FO-2223-10 manufactured by Freudenberg & CO, KG, thickness of 100 μm, polypropylene/polyethylene Support 2226-14: non-woven cloth, FO-2226-10 manufactured by Freudenberg & CO, KG, thickness of 160 μm, polypropylene/polyethylene Support 05HT-24: non-woven cloth, 05HT-24 manufactured by HIROSE PAPAER MFG CO., LTD., thickness of 51 μm, PET Methanol: manufactured by Wako Pure Chemical Industries, Ltd.

Acetone: manufactured by Wako Pure Chemical Industries, Ltd.

N,N-dimethylpiperazine: manufactured by Wako Pure Chemical Industries, Ltd.

N,N,N',N'-tetramethyl-1,3-diaminopropane: manufactured by TOKYO CHEMICAL INDUSTRY CO., LTD.

Ethylenediamine: manufactured by Wako Pure Chemical Industries, Ltd.

2N HCl: aqueous solution of 2N hydrochloric acid, manufactured by Sigma-Aldrich Co. LLC.

AIBN: azobisisobutyronitrile, manufactured by Wako Pure Chemical Industries, Ltd.

The solution described in paragraph "0137" of JP2009-193957A that was used in Comparative Example 15 was prepared as below.

1.30 g of 1,2-ethanediamine and 2.02 g of 1,2-dibromoethane were dissolved in 200 ml of methanol and reacted in a 500 ml eggplant flask for 10 hours at 35° C. Then, 1.8 g of p-vinylbenzyl chloride was added to the eggplant flask, followed by a reaction for 12 hours at 35° C. 2 g of AIBN was added to the solution obtained after the reaction, and the mixture was partially polymerized at 60° C. in a nitrogen atmosphere, thereby obtaining a solution of a basic polymerizable compound (Mw=900) (solution described in paragraph "0137" of JP2009-193957A).

In Comparative Example 15, the above solution was concentrated as described in Table 6 so as to obtain the aforementioned basic polymerizable compound, the compound was dissolved in pure water so as to obtain a 50% by mass aqueous solution, and 1% by mass AIBN was added thereto, thereby preparing a composition for forming a membrane.

Chemical structures of ion exchange resins obtained in Examples 1 to 5, 7 to 12, 22 to 43, and 46 and Comparative Examples 2 to 7 will be shown below. The constitutional unit represented by Formula 1, the constitutional unit represented by 2, and two kinds of other constitutional units will be shown in this order from the left. The content of each of the constitutional units is as shown in each table described above.

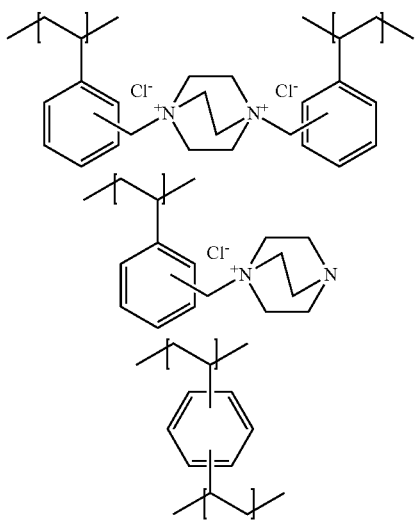

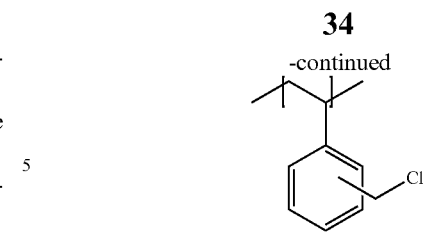

Chemical structures of ion exchange resins obtained in Example 6 will be shown below. The constitutional unit represented by Formula 1, the constitutional unit represented by Formula 2, and three kinds of other constitutional units will be shown in this order from the left. The content of each of the constitutional units is as shown in Table 1.

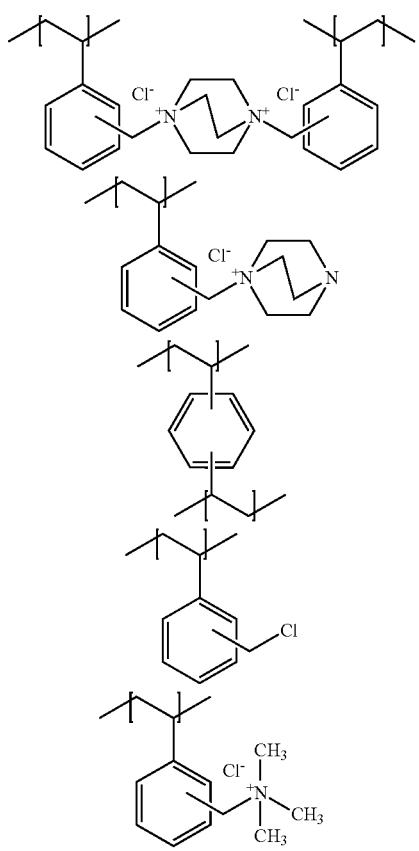

Chemical structures of ion exchange resins obtained in Examples 13 to 15 and Comparative Examples 8 and 9 will be shown below. The constitutional unit represented by Formula 1, the constitutional unit represented by Formula 2, and two kinds of other constitutional units will be shown in this order from the left. The content of each of the constitutional units is as shown in each table described above.

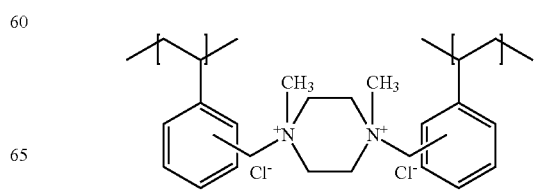

-continued

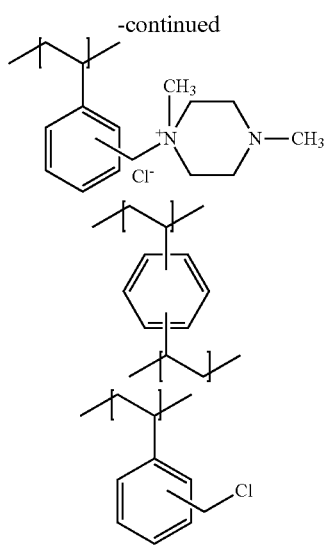

Chemical structures of ion exchange resins obtained in Examples 16 to 18 and Comparative Examples 10 and 11 will be shown below. The constitutional unit represented by Formula 1, the constitutional unit represented by Formula 2, and two kinds of other constitutional units will be shown in this order from the left. The content of each of the constitutional units is as shown in each table described above.

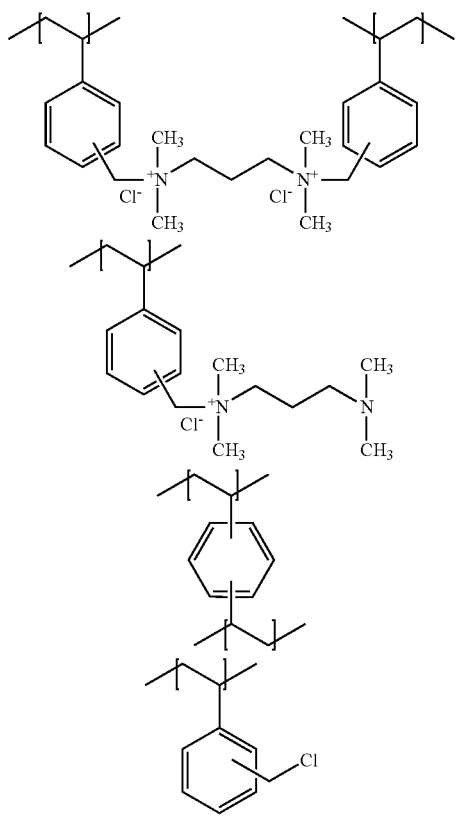

Chemical structures of ion exchange resins obtained in Examples 19 to 21 and Comparative Examples 12 and 13 will be shown below. The constitutional unit represented by Formula 1, the constitutional unit represented by Formula 2, and two kinds of other constitutional units will be shown in this order from the left. The content of each of the constitutional units is as shown in the each table described above.

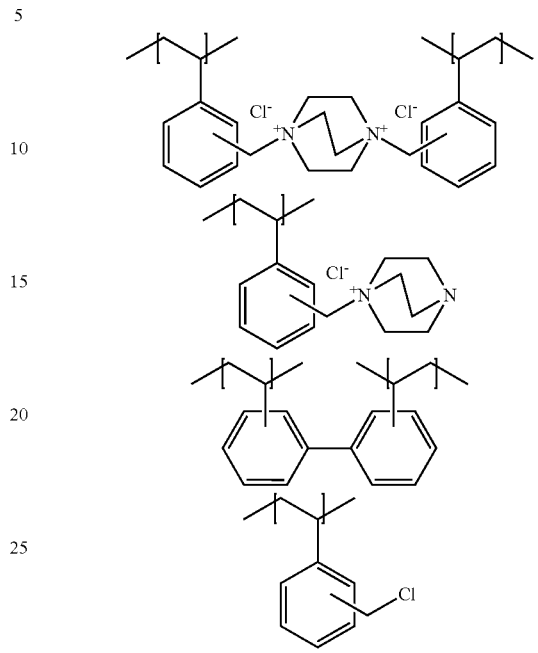

Chemical structures of ion exchange resins obtained in Example 44 will be shown below. The constitutional unit represented by Formula 1, the constitutional unit represented by Formula 2, and two kinds of other constitutional units will be shown in this order from the left. The content of each of the constitutional units is as shown in Table 13.

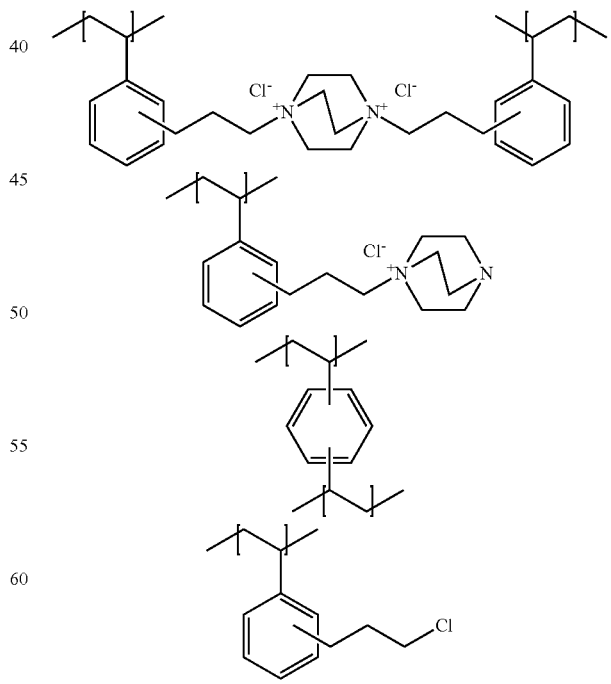

Chemical structures of ion exchange resins obtained in Example 45 will be shown below. The constitutional unit represented by Formula 1, the constitutional unit represented by Formula 2, and two kinds of other constitutional units will be shown in this order from the left. The content of each of the constitutional units is as shown in Table 13.

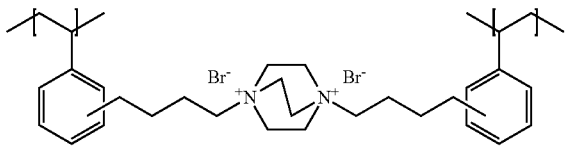

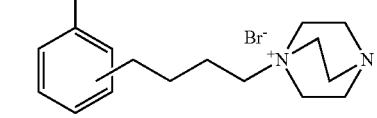

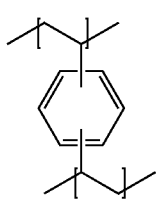

Chemical structures of ion exchange resins obtained in Comparative Example 1 will be shown below. The constitutional unit represented by 2 and another constitutional unit will be shown in this order from the left. The content of each of the constitutional units is as shown in Table 4.

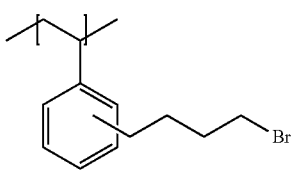

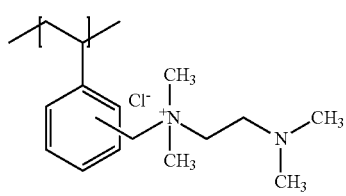

Chemical structures of ion exchange resins obtained in Comparative Example 14 will be shown below. Three kinds of constitutional units will be shown in order.

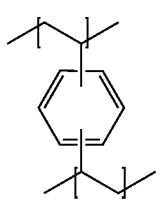

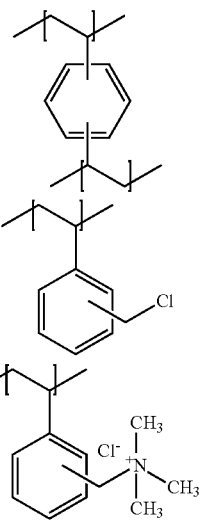

Chemical structures of ion exchanges resins obtained in Comparative Example 16 will be shown below. Four kinds of constitutional units will be shown in order.

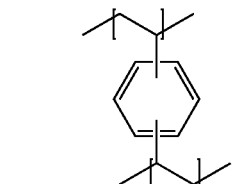

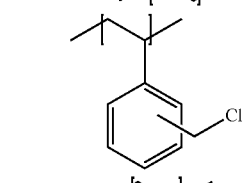

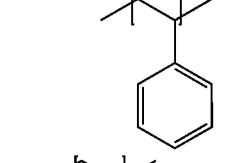

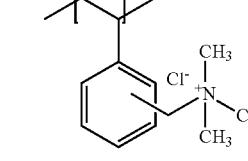

Chemical structures of ion exchange resins obtained in Comparative Example 17 will be shown below. Five kinds of constitutional units will be shown in order.

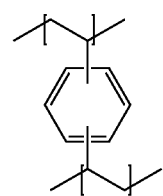

-continued

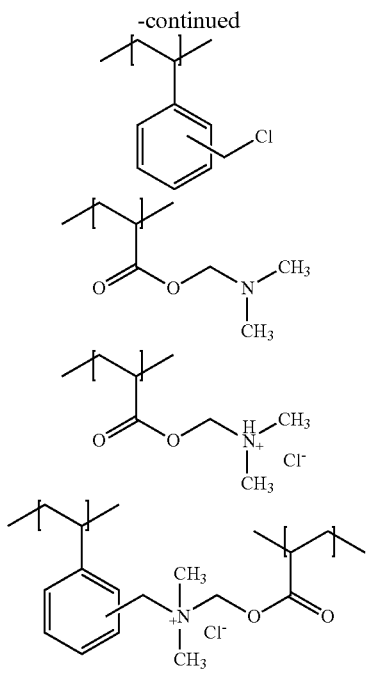

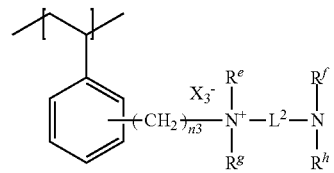

(2)

in Formula 2, $L^2$ represents an alkylene group or an alkenylene group, $R^e$, $R^f$, $R^g$, and $R^h$ each independently represent an alkyl group or an aryl group, $R^e$ and $R^f$ and/or $R^g$ and $R^h$ may form a ring by being bonded to each other, n3 represents an integer of 1 to 10, and $X_3^-$ represents an organic or inorganic anion.

3. The ion exchange membrane according to claim 1, wherein $R^a$ and $R^b$ and/or $R^c$ and $R^d$ form a ring by being bonded to each other.

4. The ion exchange membrane according to claim 2, wherein $R^e$ and $R^f$ and/or $R^g$ and $R^h$ form a ring by being bonded to each other.

5. The ion exchange membrane according to claim 1, wherein $X_1^-$ and $X_2^-$ each independently are a halide ion.

6. The ion exchange membrane according to claim 1, wherein the resin further has a cross-linked structure in addition to the constitutional unit represented by Formula 1.

7. The ion exchange membrane according to claim 6, wherein a content of the cross-linked structure other than the constitutional unit represented by Formula 1 is 0.05 to 0.5 mmol/g with respect to a total mass of the resin.

8. A method for manufacturing the ion exchange membrane according to claim 1, comprising:
a membrane preparation step of preparing a membrane containing a resin having a constitutional unit represented by Formula 3; and
a reaction step of reacting the membrane with an amine compound represented by Formula 4,

EXPLANATION OF REFERENCES

1: membrane
2: arrow showing a state where water in feed solution passed into draw solution through membrane
3: flow channel of feed solution
4: flow channel of draw solution
5: direction of movement of liquid
10: flow channel of water permeability measurement device

What is claimed is:
1. An ion exchange membrane comprising:
a resin having an amino group and a constitutional unit represented by Formula 1,
wherein the number of amino groups per dry mass is 0.15 to 2.4 mmol/g,

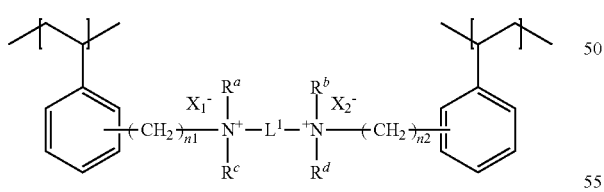

(1)

in Formula 1, $L^1$ represents an alkylene group or an alkenylene group, $R^a$, $R^b$, $R^c$, and $R^d$ each independently represent an alkyl group or an aryl group, $R^a$ and $R^b$ and/or $R^c$ and $R^d$ may form a ring by being bonded to each other, n1 and n2 each independently represent an integer of 1 to 10, and $X_1^-$ and $X_2^-$ each independently represent an organic or inorganic anion.

2. The ion exchange membrane according to claim 1, wherein the resin has, as a structure having the amino group, a constitutional unit represented by the following Formula 2 in at least a portion of the resin,

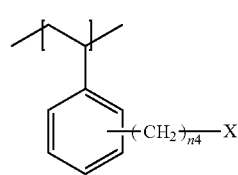

(3)

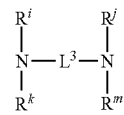

(4)

in Formulae 3 and 4, n4 represents an integer of 1 to 10, X represents a leaving group, $L^3$ represents an alkylene group or an alkenylene group, $R^i$, $R^j$, $R^k$, and $R^m$ each independently represent an alkyl group or an aryl group, and $R^i$ and $R^j$ and/or $R^k$ and $R^m$ may form a ring by being bonded to each other.

9. The method for manufacturing the ion exchange membrane according to claim 8,
wherein in the membrane preparation step, the resin having a constitutional unit represented by Formula 3 is formed by polymerizing a composition containing a compound represented by Formula 5 and a polymerization initiator,

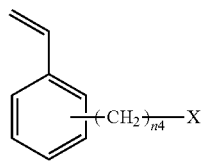

(5)

in Formula 5, n4 represents an integer of 1 to 10, and X represents a leaving group.

10. The method for manufacturing the ion exchange membrane according to claim 9,
wherein the compound represented by Formula 5 is a liquid at 25° C.

11. The method for manufacturing the ion exchange membrane according to claim 9,
wherein a content of the compound represented by Formula 5 in the composition is equal to or greater than 50% by weight.

12. The method for manufacturing the ion exchange membrane according to claim 9,
wherein the composition does not contain an organic solvent, or a content of an organic solvent in the composition is greater than 0% by mass and equal to or less than 1% by mass.

13. The method for manufacturing the ion exchange membrane according to claim 8,
wherein X is a halogen atom.

14. The method for manufacturing the ion exchange membrane according to claim 8,
wherein in the reaction step, both of the constitutional unit represented by Formula 1 and the constitutional unit represented by Formula 2 are formed in the resin.

15. A module comprising:
the ion exchange membrane according to claim 1.

16. A device comprising:
the ion exchange membrane according to claim 1.

* * * * *